US012780257B1

(12) United States Patent
Goldman et al.

(10) Patent No.: US 12,780,257 B1
(45) Date of Patent: Nov. 3, 2026

(54) TIME-DEPENDENT VEHICLE CONSTRAINTS

(71) Applicant: Zoox, Inc., Foster City, CA (US)

(72) Inventors: Meredith James Goldman, Redwood City, CA (US); Collin MacGregor, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 257 days.

(21) Appl. No.: 18/128,908

(22) Filed: Mar. 30, 2023

(51) Int. Cl.
*B60W 60/00* (2020.01)
*B60W 50/02* (2012.01)

(52) U.S. Cl.
CPC .. *B60W 60/00186* (2020.02); *B60W 50/0205* (2013.01); *B60W 2756/10* (2020.02)

(58) Field of Classification Search
CPC ......... B60W 2756/10; B60W 50/0205; B60W 60/00186
See application file for complete search history.

(56) References Cited

U.S. PATENT DOCUMENTS

| | | | | |
|---|---|---|---|---|
| 10,579,070 | B1 * | 3/2020 | Konrardy | G01C 21/3415 |
| 2015/0375741 | A1 * | 12/2015 | Kiriya | G06V 40/28 701/2 |
| 2016/0282874 | A1 * | 9/2016 | Kurata | G01S 7/497 |
| 2019/0300007 | A1 * | 10/2019 | Hilligardt | B60W 50/029 |
| 2020/0064848 | A1 * | 2/2020 | Dudar | G07C 5/02 |
| 2020/0094850 | A1 * | 3/2020 | Chi | G05D 1/617 |
| 2020/0193833 | A1 * | 6/2020 | Matsunaga | G05D 1/0212 |
| 2020/0211394 | A1 * | 7/2020 | King | B60W 50/023 |
| 2020/0391757 | A1 * | 12/2020 | Kim | B60W 60/00186 |
| 2021/0096570 | A1 * | 4/2021 | Engle | G05D 1/0276 |
| 2021/0229702 | A1 * | 7/2021 | Tsuji | B60W 60/0016 |
| 2022/0170752 | A1 * | 6/2022 | Beaurepaire | B60W 50/0205 |
| 2022/0194397 | A1 * | 6/2022 | Hotta | B60W 60/0011 |
| 2022/0333934 | A1 * | 10/2022 | Grealish-Rust | G01C 21/3614 |
| 2022/0365530 | A1 * | 11/2022 | Foster | B60W 60/0015 |
| 2022/0371618 | A1 * | 11/2022 | Vora | G08G 1/096827 |
| 2023/0140569 | A1 * | 5/2023 | Foster | B60W 60/00274 701/400 |
| 2023/0311929 | A1 * | 10/2023 | Laws | B60W 50/029 701/23 |
| 2024/0185717 | A1 * | 6/2024 | Wendt | B62J 45/00 |
| 2024/0296428 | A1 * | 9/2024 | Horihata | G06Q 10/00 |
| 2024/0410713 | A1 * | 12/2024 | Horihata | G01C 21/3697 |

* cited by examiner

*Primary Examiner* — Fadey S. Jabr
*Assistant Examiner* — Michael J Herrera
(74) *Attorney, Agent, or Firm* — Lee & Hayes, P.C.

(57) ABSTRACT

Techniques are discussed for vehicle fault management, including determining and applying time-dependent and/or distance-dependent constraints to enable the vehicle to respond safely and appropriately to faults. In various examples, a fault may be detected by a vehicle component or system, indicating a condition necessitating the vehicle to cease operating on the road surface within a time- or distance-based driving constraint. Additional techniques may include determining, via a route planning component and/or a remote control system, a modified destination such as a pullover location for the vehicle. The modified destination may be determined based on the time- and/or distance-based constraint determined based on one or more vehicle faults, map data of the driving environment, and/or factors such as the driving conditions and the state of additional vehicles in the vehicle fleet.

20 Claims, 9 Drawing Sheets

500

700

EXAMPLE TIME-DEPENDENT CONSTRAINT TABLE

| | ID | Vehicle Component | Fault | Condition | Time Constraint | Distance Constraint |
|---|---|---|---|---|---|---|
| 702 | ID_01 | Tire Pressure Sensor (Front-Right) | Low Pressure | -- | 10 mins | 5 miles |
| 704 | ID_02 | Monitoring System | Error | -- | 30 secs | -- |
| 706 | ID_03 | Stability Control Sys. | Outage | -- | 2.5 mins | 1 mile |
| | | Braking Sys (Rear) | Error | -- | | |
| 708 | ID_04 | Long-Range Lidar Sensor | Outage | Fog/Rain | 1 min | 0.5 miles |
| 710 | ID_05 | Camera (Front-Left) | Occlusion | Night Driving | 10 mins | 2 miles |

FIG. 7

TIME-DEPENDENT VEHICLE CONSTRAINTS

BACKGROUND

Vehicles may include various sensor systems and/or other components to assist the vehicle with navigating the environment. For instance, a vehicle having autonomous vehicle functionality may include components configured to detect objects, predict object trajectories, and plan and execute driving routes to guide the vehicles safely and efficiently through driving environments with other moving vehicles (autonomous or otherwise), pedestrians, stationary objects, etc. As a vehicle (autonomous or otherwise) traverses a driving environment, circumstances can arise that can make it impractical or unsafe for the vehicle to continue operating. For instance, faults occurring within various vehicle systems or components, along with certain driving conditions (e.g., weather conditions, visibility conditions, traffic congestion, etc.) can make vehicle operation unsafe or otherwise impractical.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 illustrates an example table including time-dependent vehicle constraints and associated sensor faults and conditions, in accordance with one or more examples of the disclosure.

DETAILED DESCRIPTION

Figure 1:
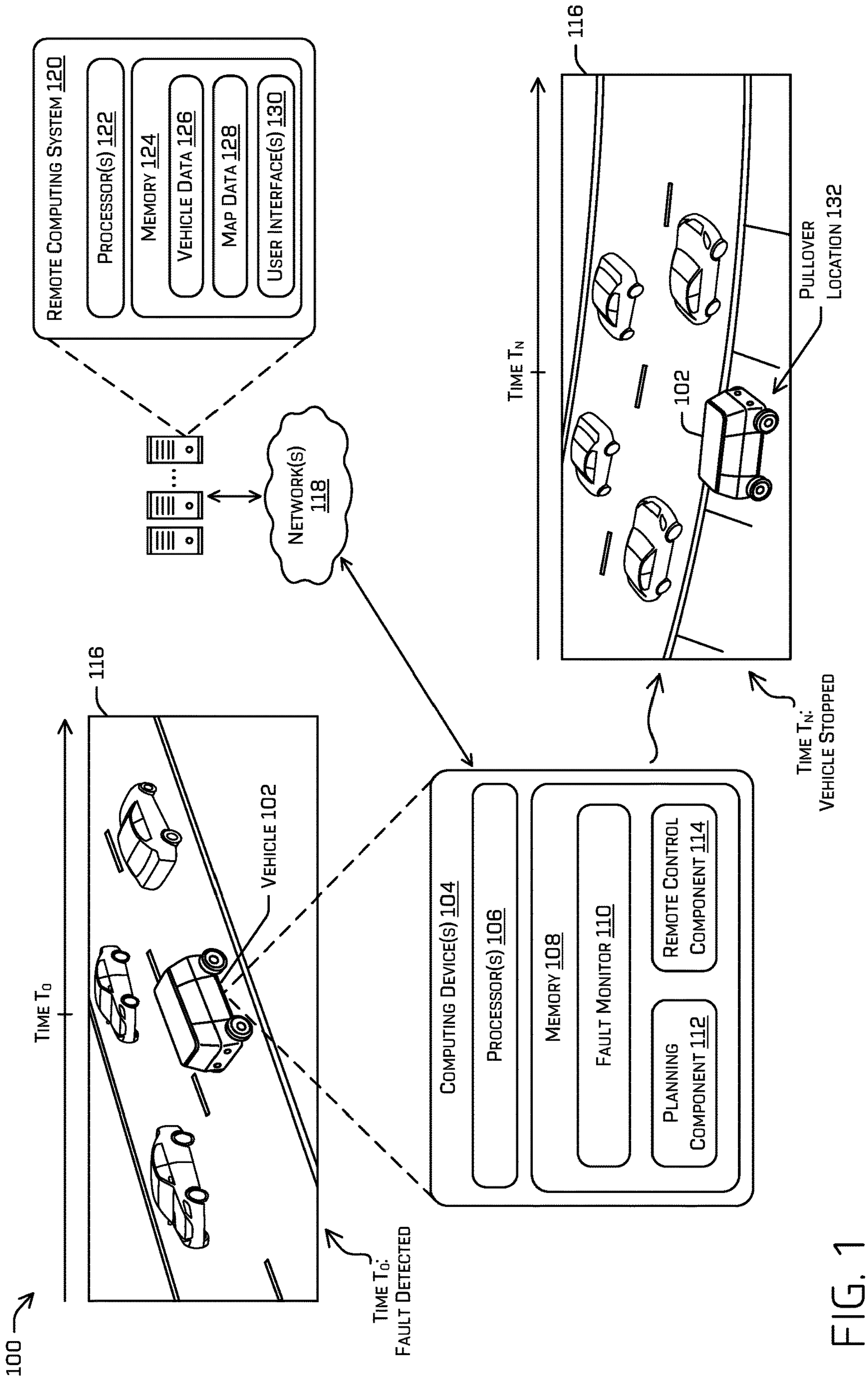
FIG. 1 illustrates an example technique for controlling a vehicle to determine a pullover location based on a time-dependent constraint, in accordance with one or more examples of the disclosure.

This application relates to vehicle fault management and, in particular, to detecting faults from vehicle components and systems and determining time-dependent and/or distance-dependent driving constraints based on the faults. As noted above, various circumstances may arise on a vehicle making it unsafe and/or otherwise impractical for the vehicle to continue operating in the environment for an extended period of time. However, in some circumstances, such as when persistent but non-urgent faults are detected in certain vehicle components, it may be safer and otherwise preferable to continue operating the vehicle for an additional period of time. For example, in response to fault indicating that a tire on the vehicle has begun to lose pressure, or a failure in a redundant sensor or other redundant component on the vehicle (e.g., where additional backup sensors or components are still operational), then a fault monitor may determine a time-dependent (and/or distance-dependent) constraint that allows the vehicle to continue operating for an additional amount of time and/or additional distance range, before the vehicle is required to stop.

When the fault monitor determines a time-dependent (and/or distance-dependent) constraint for stopping the vehicle, it may provide an indication of the constraint to a route planning component and/or a remote vehicle control system to apply the constraint. These components may be configured to determine modified (or alternative) destinations, which may include optimal parking or pullover locations for the vehicle based on the constraint time and/or distance. For example, the planning component and/or remote control system may compare the stopping requirements of the constraint (e.g., a maximum operating time and/or maximum driving distance) to the current driving trip (or mission) of the vehicle, to determine whether or not the vehicle will be able to complete its current mission before stopping. When the vehicle's current mission cannot be completed due to the constraint, the planning component and/or remote control system may determine a modified destination (e.g., a pullover location) for the vehicle, that will comply with the constraint. In various examples, the planning component and/or remote control system may determine an optimal modified destination based on the time and/or distance constraints, the map data associated with the current driving route and destination of the vehicle, and/or other factors such as the current driving conditions, the locations and states of the additional vehicles in the vehicle fleet, etc. In some cases, the planning component and/or remote control system may determine and evaluate multiple candidate pullover locations (e.g., using cost functions) based on vehicle and passenger safety, route progress, and efficiency with respect to completing the driving mission and/or repairing the vehicle.

After determining a modified (or alternative) destination for the vehicle based on a time-dependent constraint, the fault monitor may continue to monitor the vehicle components and systems to assure that the detected faults and/or other operating conditions of the vehicle do not deteriorate further. Additionally, the fault monitor may monitor the pullover response of the vehicle (e.g., the driving route determined by the planning component or teleoperator to the modified destination) to assure that the response complies with the constraint, and that the vehicle will be able to successfully navigate to the modified destination and stop (e.g., park or pull over) before the constraint time and/or distance are reached. If the vehicle does not pullover within the required time or distance to comply with the constraint, or if the vehicle conditions deteriorate further and an earlier pullover is required, the fault monitor may supersede the driving route to the modified destination determined by the planning component and/or teleoperator, and may stop the vehicle sooner by applying one or more contingent stopping maneuvers (e.g., immediate stop, pullover in lane, pullover on shoulder, etc.).

In various examples herein, a fault monitor component of the vehicle may determine time constraints (or time-dependent constraints) that define an amount of time after which the vehicle may be required to stop (e.g., park or pull over). Additionally, or alternatively, any combination of vehicle faults and/or conditions described herein also can be associated with distance constraints, that define a driving distance or range within which the vehicle may be required to stop. In still other examples, any of the various constraints described herein may include additional geographic constraints (e.g., specific locations where the vehicle may be permitted and/or prohibited to pull over), system- or component-related constraints (e.g., constraints requiring that the vehicle not exceed a certain speed, a maximum acceleration, maximum braking force, etc.), and/or the like. As described in more detail below, the fault monitor may receive data relating to faults and/or any other conditions within any vehicle components and/or associated with the current driving environment in which the vehicle is operating. Based on this data, the fault monitor may determine a holistic representation of the overall vehicle state, taking into account all available data associated with the current vehicle state, from which it can determine an appropriate course of action to follow based on a vehicle component fault or diagnostic. The fault monitor may, in some instances, provide a set of time-dependent constraint(s) to the various systems or components of the vehicle (e.g., the planning component and/or remote control component). In addition to the constraint times and/or distances defined by time-dependent constraints, the constraints may include a maximum allowed speed range that the planning component and/or teleoperator may operate within. Additionally, if the fault monitor detects a diagnostic that requires a reduction in this maximum speed range, it may then provide an update lowering the maximum speed range to the planning component and/or remote control system, which these components may use to plan trajectories, determine lowest-cost or optimal routes, etc. The outputs of the fault monitor may be used to bound any other systems and/or components of the vehicle, allowing those systems/components to reconfigure their behavior within a different operating envelope.

As described above, time and/or distance constraints determined by the fault monitor may be associated with the operation or movement of the vehicle. For instance, a constraint time or distance may define the time/distance by which the vehicle is to be stopped and/or turned off. However, time and/or distance constraints also may be associated with particular driving conditions, driving regions, and/or driving modes of the vehicle (e.g., additionally or alternatively to the operation or movement of the vehicle). As an example, the fault monitor of a vehicle may determine a time or distance constraint that applies for night driving by the vehicle, including an amount of time (or a distance range) that the vehicle can continue to drive at night, after which the vehicle may be limited to operating during daytime hours (or may be required to stop at night or in other low visibility driving conditions). As another example, for an autonomous vehicle that supports bidirectional operation (e.g., in which the vehicle may proceed through the environment in a forward direction according to a direction of traffic with either end of the vehicle in the "front" of the traveling direction), a time or distance constraint determined by the fault monitor may be associated with any of the possible "front" ends of the vehicle. In such examples, after the amount of time or distance range of the constraint has been reached, the vehicle may be restricted to driving with only one end as the "front" end of the vehicle with respect to the direction of traffic. As yet another example, a time or distance constraint may be determined by the fault monitor for driving in a particular region and/or on a particular road type (e.g., time or distance constraints for highway driving, driving in traffic congested areas, driving on unpaved roads, roads driving on roads with a speed limit above or below a threshold value, etc.), after which the vehicle may be restricted to not driving in the particular regions and/or on the particular types of roads.

After the fault monitor determines a time-based or distance-based constraint for operating the vehicle (e.g., based on one or more faults detected by the vehicle's components and/or systems), the fault monitor may send an indication to the planning component of the vehicle and/or to a remote teleoperator indicating that the vehicle should be stopped before the constraint time and/or distance is reached. Based on the indication, the planning component and/or teleoperator may determine an optimal location, time, route, etc., for stopping (e.g., pulling over or parking) the vehicle. Thus, instead of immediately stopping the vehicle upon detection of the fault/condition, which may cause traffic delays or other unsafe situations (e.g., pulling the vehicle over on a busy freeway, stopping the vehicle in a traffic lane or road shoulder and impeding the flow of traffic, etc.), the time and/or distance vehicle constraints described herein may allow the vehicle to continue operating for an additional amount of time compliant with the constraint, until the vehicle reaches an improved pullover location.

After a time-dependent constraint is determined, one or more of the fault monitor, the planning component, and/or the remote teleoperator controlling the vehicle via the remote control system may determine whether the vehicle can complete its current mission. The current mission of the vehicle may include, for instance, driving to a pickup location to pick up a group of passengers and/or items, transporting the passengers and/or items currently in the vehicle to one or more predetermined destinations, or driving the vehicle to a storage or maintenance location, etc. As an example, if a vehicle is transporting a group of passengers to a destination with an estimated arrival time in 8 minutes, when the fault monitor determines a time-dependent constraint that requires the vehicle to stop within the next 30 minutes, then the vehicle may determine that it can complete its current mission as planned before responding to the constraint. In some examples, the fault monitor may initially compare the time and/or distance of a constraint to the estimated time and/or distance of the current mission of the vehicle and may transmit an indication of the constraint only when it determines that the vehicle cannot complete its current mission before the constraint time and/or distance.

In some cases, the fault monitor also may determine confidence levels associated with the estimated current mission time and/or current mission distance and may apply confidence thresholds to determine whether or not the vehicle should be able to complete its mission before reaching a constraint time and/or distance. As an example, after determining a time-dependent constraint during a mission, the fault monitor may use uncertainties based on vehicle speed, traffic lights, traffic congestion, etc., to determine a likelihood (e.g., 50%, 65%, etc.) that the vehicle can complete its mission before the constraint time and/or distance is reached. The fault monitor then may compare the likelihood to a confidence threshold (e.g., 80%, 90%, etc.), to determine whether the fault monitor is sufficiently confident that the vehicle can complete its mission before reaching the constraint. In some cases, the fault monitor may add safety buffers to the estimated mission time (e.g., 1 minute, 2 minutes, 5 minutes, 10 minutes, etc.) or estimated mission distance (e.g., 0.25 miles, 1 mile, 5 miles, etc.), so that determinations that the vehicle is likely to complete its mission before the constraint can be made with greater confidence.

When the fault monitor is not sufficiently confident that the mission can be completed before reaching the time and/or distance of the constraint, it may send the constraint indication to the planning component and/or remote control system to determine a modified destination (e.g., parking or pullover location) for the vehicle. In some examples, when the fault monitor is sufficiently confident that the mission can be completed before the constraint time and/or distance, it may determine not to send a constraint indication to the planning component and/or remote control system. In other examples, the fault monitor may send all time-dependent constraint indications (e.g., with constraint times, distances, and/or other driving requirements) to the planning component and/or remote control system in all cases (e.g., and need not determine whether the vehicle's current mission can be completed), to allow the planning component and/or remote control system to determine the optimal destination for the vehicle (e.g., the current mission destination or an optimal modified destination) based on the constraint.

The fault monitor component (or fault monitor) of the vehicle may detect or otherwise determine the presence of the condition necessitating that the vehicle pull over. In some examples, the fault monitor may be isolated and/or hardened from hardware of the vehicle that is running other high-level systems (e.g., perception system, planning system, prediction system, drive system, etc.). In other words, the fault monitor may be a low-level system that operates on one piece of hardware to monitor the high-level systems, which may be running on another piece of hardware, and request actions independently to the other high-level components. In this way, if the hardware that the high-level systems are running on experiences a failure in any way, the redundancy of having the monitoring system run independently on another piece of hardware can ensure that the monitoring system will detect fault conditions and, if so, bring the vehicle to a stop. The fault monitor may receive various types of data associated with the vehicle operating in an environment. Such data may include, but is not limited to, health-related data associated with various components or systems of the vehicle (e.g., data indicating whether any components or systems of the vehicle are in a faulted or abnormal state), environmental data (e.g., weather-related data), traffic-related data, occupant-related data (e.g., data associated with occupants of the vehicle), or the like.

As noted above, the techniques described herein may include determining time-dependent constraints based on the presence of a fault condition necessitating that the vehicle pull over or otherwise cease from operating on a portion of a road surface. In some cases, one portion of the road surface may be a drivable portion, such as a traffic lane, that is designated for vehicle travel and use, as opposed to a non-traffic lane, which may be designated as potential stopping locations for the vehicle (e.g., for parking, emergency stopping, or the like). Additional potential stopping locations for the vehicle may include road shoulders and pullout lanes, parking spaces, parking lots, driveways, etc. As described herein, different potential stopping locations for the vehicle may have associated costs, including passenger and/or vehicle safety costs, route progress costs, as well as actual monetary costs (e.g., parking lot or meter fees, etc.), which can be evaluated using one or more cost functions.

In various examples, the fault conditions (or faults) causing the fault monitor to determine and output a time-dependent constraint may include faults associated with a component or system of the vehicle (or combination of components/systems), conditions associated with an occupant of the vehicle, environmental conditions, emergency conditions, and/or the like. For instance, a fault associated with a component or system of the vehicle, such as a fault associated with a sensor of the vehicle, a perception system of the vehicle, a prediction system of the vehicle, a braking or propulsion system of the vehicle, and/or other components of the vehicle (e.g., wheels, tires, lights, electronics, doors, windows, etc.), or the like. In other examples, a condition resulting in a time-dependent constraint may be associated with an occupant of the vehicle, such as a medical condition of the occupant (e.g., seizure, fainting, injury, sickness, etc.), the occupant requesting to exit the vehicle, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate to the vehicle.

As noted above, certain techniques may include determining whether faults and/or other conditions necessitate that the vehicle stop or pull over immediately, or whether the vehicle can continue to operate for an additional amount of time under certain constraint(s). For instance, the fault monitor may determine whether the vehicle may continue operating or, instead, pull over, based on a type of the fault condition (e.g., whether the condition is a fault of a system or component, a weather condition, a passenger condition, an emergency condition, etc.). For instance, if the condition is a fault associated with a component or system of the vehicle that renders the vehicle in a technically degraded state but still fully functional, then the vehicle may be able to continue operating for a certain period of time. Additionally, or alternatively, whether the vehicle can continue operating may be determined based at least in part on a cost associated with the fault condition. In some instances, the cost may be determined based on one or more of the type of the condition, a significance of the condition (e.g., how severe the condition is), a remedy for the condition (e.g., how long or difficult to fix the condition), and/or the like. In some examples, the fault monitor may compute a cost associated with the current vehicle condition(s) (e.g., between 0 and 1) where the magnitude of that number may be calculated based on one or more of the significance of the condition, the type of the condition, the remedy of the condition, or the like.

When the fault monitor determines that the vehicle can continue operating (e.g., that an immediate stop is not required), then one or more time-dependent constraint(s) may be determined for operating the vehicle. The operating times, driving distances, and/or other vehicle limitations associated with such constraint(s) may be determined based at least in part on the condition(s), including based on a type of the conditions, costs associated with the conditions, or the like. For time-based and distance-based constraints, the length of the time/distance may be determined based on the faults and/or the magnitude of the cost associated with the faults and/or other conditions. For instance, faults/conditions that are more severe may be given a shorter period of time and/or shorter driving distance, and conditions that are less severe may be given a longer period of time and/or longer driving distance. Additionally, in some cases, the fault monitor may determine confidence values and/or uncertainty data associated with faults or conditions, and the confidences and/or uncertainty data may be used to determine the length of the time/distance in a time-based constraint. For instance, a component fault detected with a lower confidence (e.g., a higher uncertainty) may cause the fault monitor to adjust upward the time/distance for an associated time-based constraint, and vice versa. In some examples, combinations of multiple faults may cause the period of time to be shortened. For instance, if a period of time was determined at a first time for a first fault (or other condition) and then a second fault (or other condition) is detected, the amount of time/distance may be shortened in some examples.

In some instances, time-dependent constraints (which may include constraint times, distances, and/or other vehicle operating limitations) may help manage the operational time before the vehicle enters a parked or stopped state. As such, the fault monitor may perform an analysis to determine the proper length of the period of time and/or driving distance to avoid causing potential adverse events. Additionally, enforcing the time-dependent constraints by bringing the vehicle to a stop when the period of time or distance has been reached (e.g., if the planner or teleoperator does not bring the vehicle to a stop sooner) may help ensure that the vehicle will be brought to a stop if the connection is severed, if the constraint is violated, or if some other error takes place.

In some examples, subsequent to sending a request and/or constraint indication to indicate that the vehicle is to pull over, the fault monitor may receive an indication from a teleoperator via a remote control system or the planning component, acknowledging the request and/or initiating a process of pulling the vehicle over. For instance, a teleoperator or a planning component of the vehicle may require some time to determine whether a modified destination is required and to determine an optimal location, time, and route for stopping the vehicle in compliance with the constraint. In some examples, the acknowledgment received from the remote control system or the planning component may indicate that one of those entities has received and is processing the request. In some examples, an additional period of time may be allocated based on the indication that the teleoperator or the planning component has acknowledged the request. That is, the period of time may be extended to allow the planning component or the teleoperator to determine an optimal stopping location in compliance with the constraint. In some examples, the fault monitor may receive a periodic signal (e.g., a heartbeat) from the planning component and/or the remote control system, to confirm that the connection has not been severed from the systems configured to stop the vehicle prior to reaching the constraint time and/or distance.

Additionally, in some examples, the fault monitor may continue to monitor whether the vehicle has ceased from operating on the road surface in accordance with the time-dependent constraint, regardless of whether the planning component and/or the remote control system have acknowledged the constraint indication with the stopping request. In this way, the fault monitor may be able to determine when the vehicle is continuing to operate on the road surface in violation of a constraint. In some examples, the fault monitor may extend the amount of time and/or distance range of a time-dependent constraint, based on determining that the planning component and/or remote control system has acknowledged and/or is in the process of stopping the vehicle. For instance, if the fault monitor determines that the vehicle has not been stopped when the constraint time and/or distance has been reached, but the vehicle is in the process of performing a parking or pullover maneuver (e.g., controlled by the planning component or teleoperator), then the fault monitor may extend the constraint time and/or distance to allow for the completion of the parking or pullover maneuver.

Additionally, or alternatively, the fault monitor may extend the time and/or distance stopping requirement of a time-dependent constraint based on determining that a teleoperator is interacting with the vehicle via a remote control system. For instance, various remote operation systems/components of the vehicle may provide indications of when a teleoperator is connected and observing the behavior of the vehicle, when the teleoperator has taken control of the route-planning/maneuvering of the vehicle, and/or when the teleoperator is in control and currently issuing driving commands to the vehicle. In various examples, when any or all of the possible interactions are detected between the vehicle and a teleoperator (e.g., connected, monitoring, actively controlling, etc.), the fault monitor may be configured to extend the time and/or distance stopping requirement of a time-dependent constraint by an amount. The amount of time and/or distance that the fault monitor may extend the stopping requirement may depend on the severity of the fault conditions, the amount of constraint time/distance that has elapsed (and is still remaining) since the constraint was applied, and/or the type of interaction that the teleoperator has with the vehicle at the time (e.g., connected, monitoring, actively controlling, etc.). However, even when one or more extensions has been applied to the time and/or distance stopping requirement of a time-dependent constraint, when the fault monitor determines that the vehicle has not been stopped when the constraint time and/or distance has been reached, then the fault monitor may cause the vehicle to stop immediately by initiating one or more contingent stopping trajectories (e.g., immediate stop, pullover in lane, pullover on shoulder, etc.).

As noted above, when the fault monitor determines a time-dependent constraint, based on a determination that vehicle can continue operating but will need to be stopped at a future time to remedy the condition, the constraint indication and stopping request for the vehicle may be sent one or both of a planning component of the vehicle, and/or a remote control system of a teleoperator. In some cases, the fault monitor may initially send the constraint indication/stopping request to the planning component. After a threshold period of time, if the planning component is unable to determine an optimal pullover location for the vehicle, then the fault monitor may send the constraint indication/stopping request to a remote control system to allow a teleoperator to determine a stopping location and a route to the stopping location. In such cases, by first transmitting the constraint indication/stopping request to the planning component to attempt to determine an optimal stopping location, this may limit the number of times that a teleoperator is invoked to determine the pullover location.

The planning component and/or the remote control system used by the teleoperator may determine one or more compliant (and/or optimal) stopping locations, times, and routes for the vehicle, based on the constraint indication/stopping request received from the fault monitor. As described below in more detail, the planning component and/or the remote control system may determine a modified destination based on the constraint times and/or distances, map data associated with the current driving environment and driving route of the vehicle, and/or other factors such as the current driving conditions (e.g., region, road type, weather, traffic, etc.). For instance, a high-definition semantic map may be encoded with locations in an environment that are available and/or optimal for the vehicle to pull over. Additionally, the planning component and/or remote control system also may determine and use the locations and/or states of other vehicles in an associated vehicle fleet to determine an optimal stopping location. For instance, the vehicle fleet data associated with the vehicle may include nearby alternative vehicles that are capable of completing the mission instead of the vehicle (e.g., passenger vehicles, item delivery vehicles, etc.), and/or repair vehicles with tools or technicians capable of remedying the faults or conditions that caused the time-dependent constraint.

As these and other examples illustrate, the techniques discussed herein can improve the functioning of computing devices associated with vehicles (autonomous otherwise) in a number of ways. For example, the disclosed techniques may enable a vehicle to take advantage of redundant components and/or systems to operate longer and still maintain safety requirements. Vehicles often include certain redundant (e.g., backup) sensors, components, and/or systems that may be used when another component or system is not functioning properly. When a redundant component or system takes over for a faulted component/system, the vehicle can still safely operate but is considered to be in a more compromised state due to not having a redundant backup for that component/system. The techniques described herein improve safety for passengers and vehicles, while allowing the vehicle to continue operating when such conditions occur.

Furthermore, the techniques described herein may improve road safety and reduce traffic congestion by reducing in-lane vehicle stops caused by vehicle component faults. For instance, when a vehicle detects that one of its systems or components has failed, the vehicle may be configured to force a stop/pullover. When this occurs, the vehicle may be configured to stop in locations that impede the flow of traffic, such as stopping in a traffic lane or pulling over to the road shoulder in an area that may present a certain accident risk or require other vehicles to change their behavior (e.g., speed, trajectory, etc.). The disclosed techniques allow for the vehicle to make quick decisions about whether it can continue to operate, and to choose improved/optimal locations for the vehicle to stop to assess and remedy the problem, or to allow passengers to transition safely to another vehicle that can complete the mission.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 illustrates an example scenario 100 including a vehicle 102 configured to determine a time-dependent constraint based on faults and/or conditions detected at the vehicle, and then to determine a modified destination and driving route for the vehicle based on the constraint. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification, or may be a vehicle without autonomous driving functionality. It is contemplated that the techniques discussed herein may apply to more than robotic control, such as for autonomous vehicles. For example, the techniques discussed herein may be applied to trajectory-finding in video games, manufacturing, augmented reality, etc.

The vehicle 102 may include one or more computing device(s) 104. The computing device(s) 104 can include one or more processors 106 and memory 108 communicatively coupled to the one or more processors 106. The one or more processors 106 can include, for example, one or more FPGAs, SoCs, ASICs, and/or CPUs. The memory 108 can be non-transitory computer-readable media. The memory 108 can store an operating system and one or more software applications, instructions, programs, and/or data to implement the methods described herein and the functions attributed to the various systems. In various implementations, the memory 108 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As shown in this example, the memory 108 may store, among various other vehicle components and systems, a fault monitor 110, a planning component 112, and a remote control component 114. In some examples, the fault monitor 110 may receive and analyze fault data (e.g., errors, outages, failures, status data, etc.) from various components and systems of the vehicle 102. In various examples, a fault may correspond to any status data, including but not limited to error data, an indication of a malfunction or an outage, etc., from any component of the vehicle 102. In some instances, fault may represent a malfunction of a component (or other condition) that increases the risk associated with operating the vehicle safely in the current driving environment. Based on the fault data and/or other conditions (e.g., weather conditions, road conditions, passenger conditions, emergency conditions, etc.), the fault monitor 110 may determine one or more time-dependent constraints on the operation of the vehicle. Time-dependent constraints may define, for example, durations of time and/or driving distances, by which the vehicle 102 may be required to stop (or to apply other operating restrictions). The fault monitor 110 may provide indications of the constraints and/or stopping requests based on the constraints, to one or more of the planning component 112 and the remote control component 114, either or both of which may determine a future stopping location, time, and/or route for the vehicle 102 based on the time-dependent constraint.

In the example scenario 100, the vehicle 102 is depicted in a driving environment 116 at a first point in time (e.g., Time $T_0$). At Time $T_0$ in this example, the fault monitor 110 detects a fault (and/or other conditions) that results in a time-dependent constraint requiring the vehicle to stop (e.g., park or pull over) within an amount of time and/or driving distance defined by the constraint. In this example, there is no available stopping location for the vehicle 102 at Time $T_0$ in the driving environment 116. For instance, although the vehicle 102 could perform an in-lane stopping maneuver or pull over onto the shoulder of the road at Time $T_0$, these options for stopping the vehicle 102 may result in safety risks and/or traffic congestion risks for the vehicle 102, passengers, and other nearby vehicles.

As a result, in this example, the fault monitor 110 may provide an indication of the constraint (which may correspond to and/or may include a time- or distance-based vehicle stopping request) to the planning component 112 and/or the remote control component 114. The constraint indication may indicate that the vehicle 102 needs to pull over or otherwise cease operating in a moving traffic lane within the defined time and/or distance. After receiving a constraint indication, the planning component 112 and/or the remote control component 114 may be configured to determine a modified destination (e.g., a stopping location) for the vehicle 102, based on the constraint time and/or distance. As described above, in some cases, the fault monitor 110 may initially provide the constraint indication to the planning component 112 on the vehicle 102. If the planning component 112 is unresponsive to the constraint indication and/or unable to determine a modified destination within the constraint time and/or distance, then the fault monitor 110 may provide the constraint indication to the remote control component 114 to allow a teleoperator to select an optimal modified destination. In other cases, the fault monitor 110 may initially provide the constraint indication to the remote control component 114 (e.g., and not to the planning component 112). The fault monitor 110 also may provide the constraint indication to both the planning component 112 and the remote control component 114 (e.g., concurrently), and then may compare the one or more modified destination(s) determined by the planning component 112 and the one or more modified destination(s) determined by the teleoperator via the remote control component 114, to select a lowest-cost and/or optimal modified destination.

The planning component 112 and/or the remote control component 114 may use various techniques, described in more detail below, to determine and evaluate potential modified destinations for the vehicle 102, based on constraints received from the fault monitor 110. For instance, the planning component 112 and/or the remote control component 114 may initially determine whether the vehicle 102 can (and should) complete its current mission before complying with the constraint. A modified destination for the vehicle 102 (e.g., a parking or pullover location), along with the estimated arrival time and driving route to the modified destination, may be determined for the vehicle to navigate to either instead of or after navigating to its current destination. To determine the modified destination for the vehicle 102 based on the constraint, the planning component 112 and/or remote control component 114 may use the constraint time and/or distance, the current driving route, other states/conditions of the vehicle, map data of the current driving environment 116 (e.g., a semantic map encoded with suitable stopping locations), and/or data relating to additional vehicles in a vehicle fleet.

At different times during the operation of the vehicle 102, the vehicle 102 may or may not be able to communicate with one or more remote computing system(s) 120 over network(s) 118. When the vehicle 102 is unable to communicate with a remote computing system 120 (which also may be referred to as a teleoperator device), the fault monitor 110 may rely on the planning component 112 to determine a modified destination, and/or may initiate an immediate vehicle stopping maneuver in response to a time-dependent constraint.

When the vehicle 102 is able to communicate with the remote computing system(s) 120, it may communicate via one or more wireless networks 118. In some examples, the network(s) 118 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications. The remote computing system 120 can include one or more processors 122 and memory 124 communicatively coupled to the one or more processors 122. The one or more processors 122 and the memory 124 can be implemented in a similar manner to the processor(s) 106 and the memory 108. The remote computing system 120 may further include a vehicle data component 126, map data component 128, and a user interface 130, configured to enable a teleoperator to interact with (and/or control) the vehicle 102 from the remote computing system 120. The vehicle data component 126 may receive, from the vehicle 102, various vehicle state data such as the current location, destination, driving route, state data, trajectory, and/or the static or dynamic objects perceived by the vehicle 102 in the driving environment 116. The map data component 128 may receive, from one or more map servers, map data for the regions proximate to the current location, intended destination, and planned driving route of the vehicle 102. The user interface 130 may provide one or more graphical interfaces to allow teleoperators to provide instructions for how the vehicle 102 is to proceed. For example, a teleoperator may use the user interface 130 to instruct the vehicle 102 to proceed to a selected destination (e.g., parking spot, pullover location, pick-up or drop-off location, etc.), and/or to instruct the vehicle 102 which driving route to take to the destination.

Returning to the example scenario 100, the vehicle 102 is depicted again in a driving environment 116 at a subsequent point in time (e.g., Time TN). At Time IN in this example, the planning component 112 and/or remote control component 114 have been used to determine the pullover location 132 as a modified destination for the vehicle 102, and the vehicle 102 has been navigated to the pullover location 132 where is it stopped. The determination of the pullover location 132 and the driving route taken by the vehicle 102 to the pullover location 132 may determined as a lowest cost or optimal stopping location for the vehicle 102 that complies with the time-dependent constraint(s) determined by the fault monitor 110. As described below, the lowest cost and/or optimal stopping locations may be determined using cost functions, machine-learning models, and/or other techniques, taking into account various cost metrics based on passenger safety, vehicle safety, route progress, mission completion time, vehicle repair time, etc.

Figure 2:
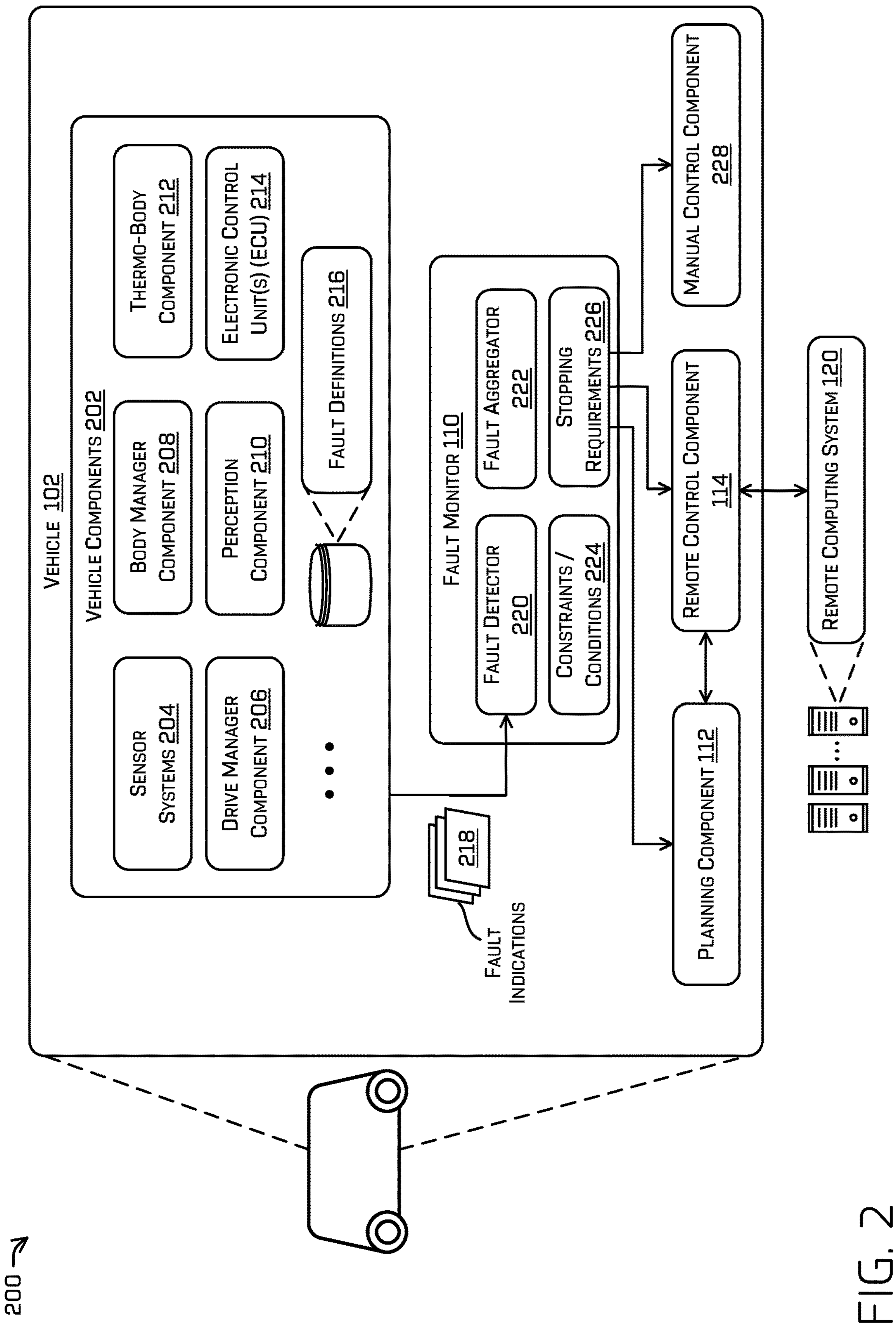
FIG. 2 is a block diagram illustrating an autonomous vehicle including a fault monitor configured to determine constraints for controlling the autonomous vehicle in response to various faults, in accordance with one or more examples of the disclosure.

FIG. 2 illustrates a vehicle 102 including various components of a fault management system configured to determine and apply time-dependent constraints. In some examples, the vehicle 102 may correspond to the same vehicle 102 described above, including a similar or identical fault monitor 110, planning component 112, and remote control component 114 configured to communicate with one or more remote computing systems 120. In various examples, the vehicle 102 may be an autonomous, semi-autonomous, or manually controlled vehicle.

As shown in this example, the vehicle 102 may include any number of vehicle components 202. The vehicle components 202 may include various hardware and/or software components used to provide various vehicle functionalities and systems, including control components, monitoring components, and/or communication components. In this example, the vehicle components 202 include sensor systems 204, a drive manager component 206, a body manager component 208, a perception component 210, a thermo-body component 212, and one or more electronic control unit(s) (ECUs) 214. As described below, any or all of the vehicle components 202 may generate and output faults representing various component errors, failures, outages, data anomalies, and the like, which may be used by the fault monitor 110 to determine time-dependent constraints. In addition to the vehicle components 202 depicted in this example, other examples of vehicle components 202 may be considered as well. For instance, each of the planning component 112, remote control component 114, the manual control component 228, and/or any other vehicle components described herein may be configured to output faults or other conditions to the fault monitor 110.

The sensor systems 204 may include, for example, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The vehicle 102 may include multiple instances of each of these or other types of sensors. For instance, the lidar sensors may include individual short-range and/or long-range lidar sensors located at the corners, front, back, sides, and/or top of the vehicle 102. As another example, the camera sensors may include multiple cameras disposed at various locations about the exterior and/or interior of the vehicle 102. As a result, certain of the sensor systems 204 may be redundant based on other sensors on the vehicle 102. Additionally, the sensor system(s) 204 may provide input (e.g., sensor data) to any or all of the other vehicle components 202.

In some examples, the drive manager component 206 may perform functions associated with controlling steering, braking, inverters, traction system(s), parking brake(s), vehicle suspension, and the like, in association with executing a trajectory for the vehicle 102. The body manager component 208, may perform functions associated with windows, doors, mirrors, seats, and so forth. The perception component 210 may perform various autonomous driving functions, for instance, functions associated with object detection, segmentation, classification, and/or tracking. The planning component 112 may receive information from the perception component 210, and may use the information to generate object predictions and/or generate trajectories for the vehicle 202 to follow to traverse the environment. In some examples, the planning component 112 may determine whether a trajectory is feasible for the vehicle 102 to execute or not, such as before the trajectory is supplied to the fault monitor 110. The remote control component 114 may perform functions associated with communication between one or more remote computing devices and the vehicle 102. For instance, the remote control component 114 may cause the vehicle 102 to initiate communication with a remote teleoperations computing device (e.g., remote computing system 120) or other remote services that may, at times, control the vehicle (e.g., under the control of a human teleoperator remote from the vehicle 102). The manual control component 228 may enable functionality for a human driver to control the vehicle 102 to traverse the environment. The thermo-body component 212 may monitor and/or regulate temperature of various components of the vehicle 102. In some examples, the ECUs 214 may correspond to any hardware component of the vehicle 102 that may communicate over a network with other systems and/or components of the vehicle 102.

Any or all of the vehicle components 202 may include storage storing one or more fault definitions 216. The fault definitions 216 may be associated with a particular fault of a corresponding vehicle components 202, or a combination of multiple faults and/or conditions associated with any combination of the vehicle components 202 as well as other conditions associated with the vehicle (e.g., weather conditions, road conditions, passenger conditions, emergency conditions, etc.). In some cases, the fault definitions 216 may include information such as a type of fault, a severity of the fault, a threshold value associated with the fault, a recommended reaction to the fault, a fault clearing mechanism, and so on. As shown in this example, when one of the vehicle components 202 experiences a fault, the vehicle component may output a fault indication 218 to the fault monitor 110.

Fault indications 218 and 234 may include various data identifying and/or explaining the fault, such as a fault identifier, a fault reaction, and/or a fault detection threshold. A fault identifier may be predetermined based on the particular fault experienced by a component of the vehicle 102 and overseen by the associated vehicle component(s) 202 which generated the fault. A fault reaction may be a predetermined recommended instruction associated with the fault for how the vehicle component(s) 202 should react to mitigate the fault. The fault detection threshold may be a value that was exceeded by a component of the vehicle that caused the component to output the fault. In some cases, the vehicle components 202 may output component diagnostics to the fault monitor 110 as well, which may indicate the status of the monitored vehicle components 202, such as whether a component or system is on or off, a temperature, a voltage, a current, a speed, a size, a frequency, and the like.

As discussed above, the fault monitor 110 may receive fault indications 218 from the various vehicle components, and may map the fault indications (and/or other vehicle conditions) to one or more time-dependent constraints. The fault monitor 110 may include a fault aggregator 222 configured to track and aggregate fault indications 218 (e.g., multiple faults from the same vehicle component 202 and/or particular combinations of faults from different components). Using the fault aggregator 222, the fault monitor 110 may determine the duration of a fault associated with a vehicle component 202, and/or may determine when a combination of faults have occurred concurrently on the vehicle 102. Based on the fault indications 218, as tracked and aggregated using the fault aggregator 222, the fault monitor 101 may determine when the current faults occurring on the vehicle 102 map to one or more constraints. The fault aggregator 222 also may receive system context data (or operating conditions), in addition to various fault indications, and may analyze the combination of current vehicle faults and system context data to determine when the combination maps to one or more constraints. The system context data may include, for instance, the current state and planned route of the vehicle (e.g., current position, pose, driving direction, velocity, etc.), and data relating to the current driving environment. For instance, the constraints and conditions component 224 may store the set of constraints that can be applied by the fault monitor 110, including the corresponding sets of faults and/or other associated conditions associated with each constraint.

When the fault monitor 110 determines a time-dependent constraint to be applied by the vehicle 102 to resolve or mitigate a fault, it may determine the stopping requirements 226 associated with the constraint, and output an indication of the constraint and/or the associated stopping requirements to one or more vehicle components 202 capable of stopping or controlling the driving route of the vehicle 102. The stopping requirements 226 associated with a time-dependent constraint may include an amount of time and/or a driving distance that the vehicle 102 can continue to operate before it is required to stop.

As shown in this example, after determining a time-dependent constraint for the vehicle 102, the fault monitor 110 may provide stopping requirements 226 associated with the constraint to the planning component 112, the remote control component 114, and/or a manual control component 228, any or all of which may be capable of determining a stopping location for the vehicle that is compliant with the stopping requirements 226, and/or re-routing the vehicle 102 to the stopping location.

Figure 3:
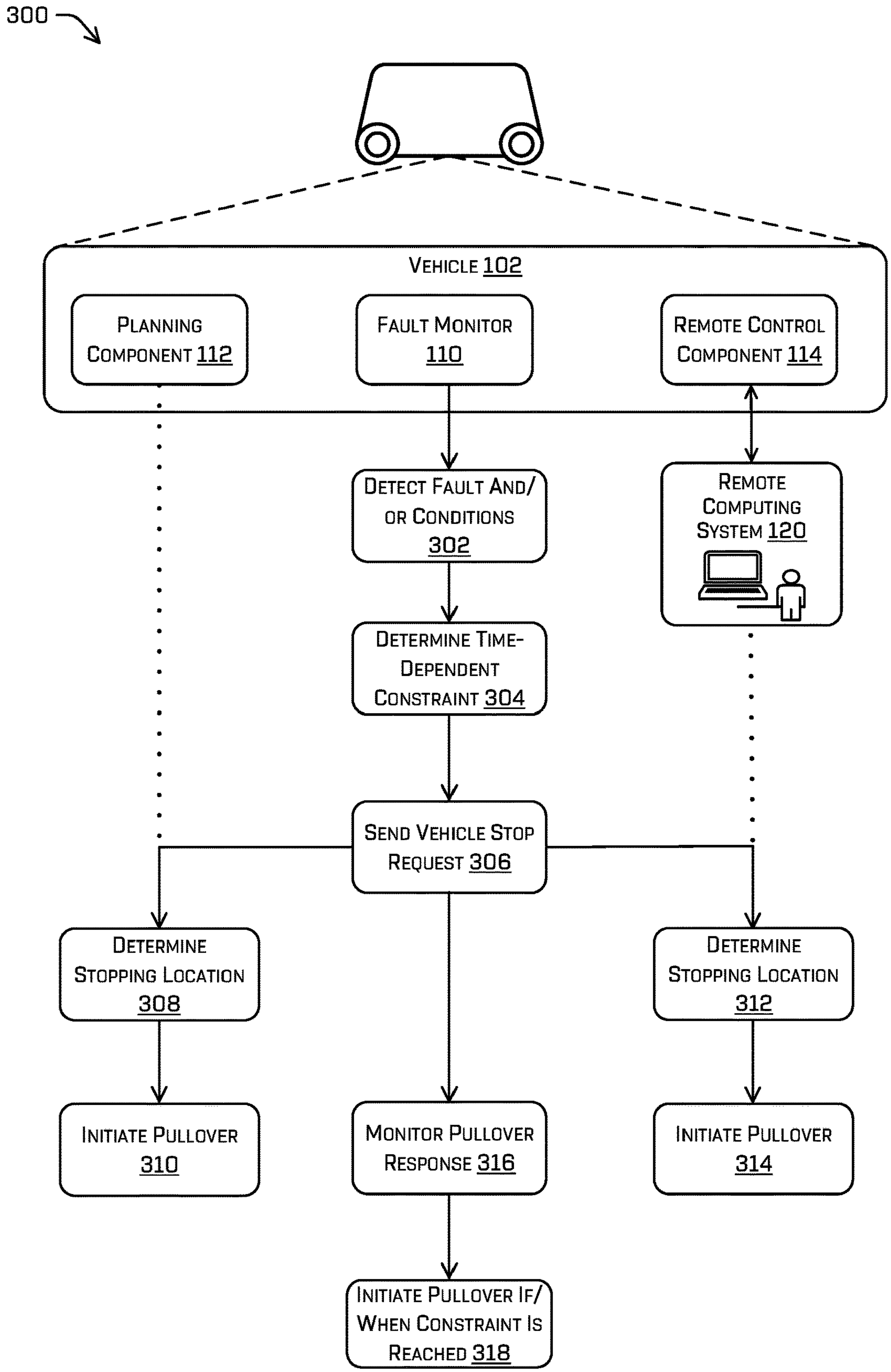
FIG. 3 is a block diagram illustrating an example process of a vehicle determining a modified destination based on a stopping requirement, and monitoring a pullover response, in accordance with one or more examples of the disclosure.

FIG. 3 is a block diagram illustrating an example process 300 of determining a modified destination for a vehicle, based on a time-dependent constraint, and monitoring the pullover response of the vehicle. As shown in this example, some or all operations of process 300 may be performed by a vehicle (e.g., vehicle 102), including a fault monitor 110, planning component 112, and remote control component 114 similar or identical to those discussed in the above examples. The vehicle 102 also may be able to communicate with one or more remote computing systems 120 (e.g., teleoperator device(s)) over one or more networks. As described above, one or more human teleoperators using the remote computing systems 120 may monitor the vehicle 102, as well as one or more other vehicles that are part of a fleet of vehicles.

At operation 302, while the vehicle 102 is operating in a driving environment, the fault monitor 110 may detect the presence of a condition that necessitates that the vehicle pull over or otherwise cease operating in the driving lanes of the environment. For example, operation 302 may include the fault monitor 110 receiving a particular fault or particular combination of faults from the vehicle components 202. Additionally or alternatively, operation 302 may include the fault monitor 110 receiving data indicating particular conditions on the vehicle 102 and/or within the driving environment. In some examples, the data received by the fault monitor 110 in operation 302 may be health-related data associated with vehicle components 202 and/or other systems of the vehicle (e.g., data indicating whether any components or systems of the vehicle are in a faulted or abnormal state), environmental data (e.g., weather-related data), traffic-related data (e.g., event data), occupant-related data (e.g., data associated with occupants of the vehicle), or the like. Similarly, the constraint conditions defined by the fault monitor 110 that may necessitate stopping the vehicle 102 in the near future may include conditions associated with components or systems of the vehicle, occupants of the vehicle, environmental conditions, emergency conditions, and/or the like. Faults received in operation 302 may include faults associated with a sensor of the vehicle, a perception system, a prediction system, a planning component, various other components of the vehicle (e.g., wheels, tires, lights, electronics, doors, windows, etc.), a network error affecting communications between the vehicle a teleoperator device, or the like. Conditions received in operation 302 may be associated with an occupant of the vehicle 102 (e.g., a medical condition of the occupant, such as a seizure, fainting, injury, sickness, etc.), or the occupant requesting to stop the vehicle or exit the vehicle 102, etc. Environmental conditions may include weather and/or visibility conditions (e.g., snow, ice, rain, fog, sleet, hail, intense heat, wind, flooding, darkness, glare, etc.) that may potentially make vehicle operations unsafe.

In some examples, the fault monitoring may further determine whether the detected faults and/or conditions in operation 302 necessitate that the vehicle 102 perform an immediate stop, or if the vehicle 102 can continue to operate for an additional period of time (e.g., a time-dependent constraint). In some examples, whether or not the vehicle 102 can continue operating may be determined by the fault monitor 110, based on the type of the faults/conditions (e.g., the systems or components from which a fault was received, a weather condition, a pedestrian condition, and emergency condition, etc.). For instance, if a fault is received from a vehicle component 202 indicating that the vehicle 102 is in a technically degraded state but is still fully functional, then the fault monitor 110 may determine that the vehicle 102 can continue operating for a certain additional period of time. Additionally, or alternatively, whether or not the vehicle 102 can continue operating may be determined based at least in part on a cost associated with the fault(s) and/or condition(s) detected in operation 302. In some instances, such costs may be determined based on one or more of the type of the fault/condition, a severity of the fault/condition, a remedy for the fault/condition (e.g., how long or difficult to fix the fault), etc.

At operation 304, if the fault monitor 110 makes the determination that the vehicle 102 can continue operating (e.g., an immediate stop is not required), then one or more time-dependent constraint(s) may be determined for operating the vehicle 102. The time-dependent constraint(s) may be determined by the fault monitor 110, based at least in part on the faults/conditions detected, costs associated with the faults/conditions, etc. In various examples, the time-dependent constraint(s) determined in operation 304 may define durations of time (e.g., seconds, minutes, hours, days, etc.) and/or distances (e.g., meters, miles, etc.) the vehicle 102 can continue to operate. After reaching the constraint time and/or distance of a time-dependent constraint, the vehicle 102 may be required to stop (e.g., park or pull over) or otherwise cease from operating in traffic. As noted above, the duration of time and/or distance defined by a constraint may be determined by the fault monitor 110, based on the faults/conditions detected and/or the magnitudes or costs associated with the faults/conditions. In some examples, combinations of different faults/conditions may cause the constraint time and/or distance to be shortened. For instance, if a first duration of time was determined at a first time based on a first fault or condition, and then a second fault or condition is detected at a subsequent time, the fault monitor 110 may shorten the first duration of time.

In some examples, the length of the period of time may be determined and/or changed dynamically based on a push and/or pull system that actively monitors or waits until a vehicle component 202 reports a fault and/or a time that the component will be operational. Additionally, or alternatively, a machine-learned model (e.g., a trained network) may determine the length of the period of time and/or the distance range of the constraint. Such machine-learned models may be trained based on known fault reporting and/or conditions, along with ground truth data indicating how long vehicles may operate under various faults and conditions. In some examples, machine-learned models can take into account the types and/or numbers of faults being reported, temperatures or voltages of vehicle batteries, environmental conditions, the age of the vehicle, etc. Additionally, in some instances, a tiered list or a hierarchy may be used for determining the duration of time and/or distance range of a constraint. For instance, such lists may be configured so that certain faults/conditions may be prescribed a specific time, and if multiple faults/conditions are present, the constraint(s) may be elevated into a higher tier and the constraint time and/or distance may be shortened.

As described above, time-dependent constraints determined in operation 304 also may include operational constraints on the vehicle 102, (e.g., unidirectional versus bidirectional operating modes, maximum velocities, maximum acceleration or braking rates, maximum turning angles, etc.), environmental constraints (e.g., only operate during daylight hours, only operate without fog or precipitation, etc.), traffic-related constraints (e.g., only operate during low traffic congestion periods), and/or the like.

At operation 306, the fault monitor 110 may send a stopping request to at least one of the planning component 112, and/or a remote computing system 120. The stopping request may indicate that the vehicle 102 needs to pull over or otherwise cease operating in traffic, and may include the constraint time and/or distance as well as any other operating restrictions associated with the constraint. In some examples, the fault monitor 110 may initially send the stopping request to the planning component 112 of the vehicle 102, and might not immediately communicate with the remote computing system 120. In such examples, if the planning component 112 does not respond or is unable to determine a satisfactory stopping location that complies with the constraint, then the fault monitor 110 may invoke the remote computing system 120. As such, the stopping request may be forwarded to the remote computing system 120, from either the planning component 112 or the fault monitor 110, to allow the teleoperator to determine an optimal stopping location, time, and route for the vehicle 102. In such examples, the planning component 112 may be given the first opportunity to determine the optimal stopping location and associated information, which may limit the number of times that the remote computing system 120 is invoked to help determine the pullover location.

At operation 308, when the time-dependent constraint is provided to the planning component 112, the planning component 112 may determine a modified destination (e.g., stopping location) and modified route for the vehicle that complies with the constraint. Then, at operation 310, the planning component 112 may navigate the vehicle 102 to the determined stopping location and initiate pulling over the vehicle 102. Additionally or alternatively, when the time-dependent constraint is provided to the remote computing system 120, the remote computing system 120 may receive input from a teleoperator (e.g., via a user interface 230) identifying a stopping location and/or modified route for the vehicle that complies with the constraint. In some instances, the fault monitor 110 may receive an indication that the planning component 112 and/or the remote computing system 120 has acknowledged the stopping request and/or are actively determining where and when to stop the vehicle 102 in compliance with the constraint.

At operation 316, after sending the constraint indications and/or stopping requests, the fault monitor 110 may monitor the pullover response of the vehicle 102. In some examples, subsequent to sending the indications/requests that the vehicle 102 is to stop, the fault monitor 110 may continue to monitor whether the vehicle 102 has stopped or is in the process of stopping (e.g., performing a parking or pullover maneuver, etc.) in accordance with the constraint. In this way, the fault monitor 110 may be able to determine whether the vehicle 102 has violated the constraint and/or if the vehicle has stopped in accordance with the constraint. In some examples, when the fault monitor 110 determines that the vehicle 102 has continued driving in violation of the constraint (e.g., beyond the constraint time and/or distance), then at operation 318 the fault monitor 110 may cause the vehicle 102 to initiate an immediate stop on the road surface. As noted above, such stops initiated by the fault monitor 110 may occur in non-optimal locations (e.g., within a traffic lane, on a narrow road shoulder, on a busy street, etc.).

In contrast, when the fault monitor 110 determines that the vehicle 102 is operating in accordance with the constraint(s) (e.g., determining that the vehicle 102 has stopped, or determining that the faults/conditions have subsided or been remedied), then the fault monitor 110 may refrain from initiating an immediate stopping maneuver at operation 318. That is, in some examples, the fault monitor 110 may refrain from causing the vehicle 102 to stop on the road surface such that the vehicle 102 impedes the flow of traffic. In this way, the vehicle 102 may continue to operate before stopping in a more optimal location and/or at a more optimal time.

Figure 4:
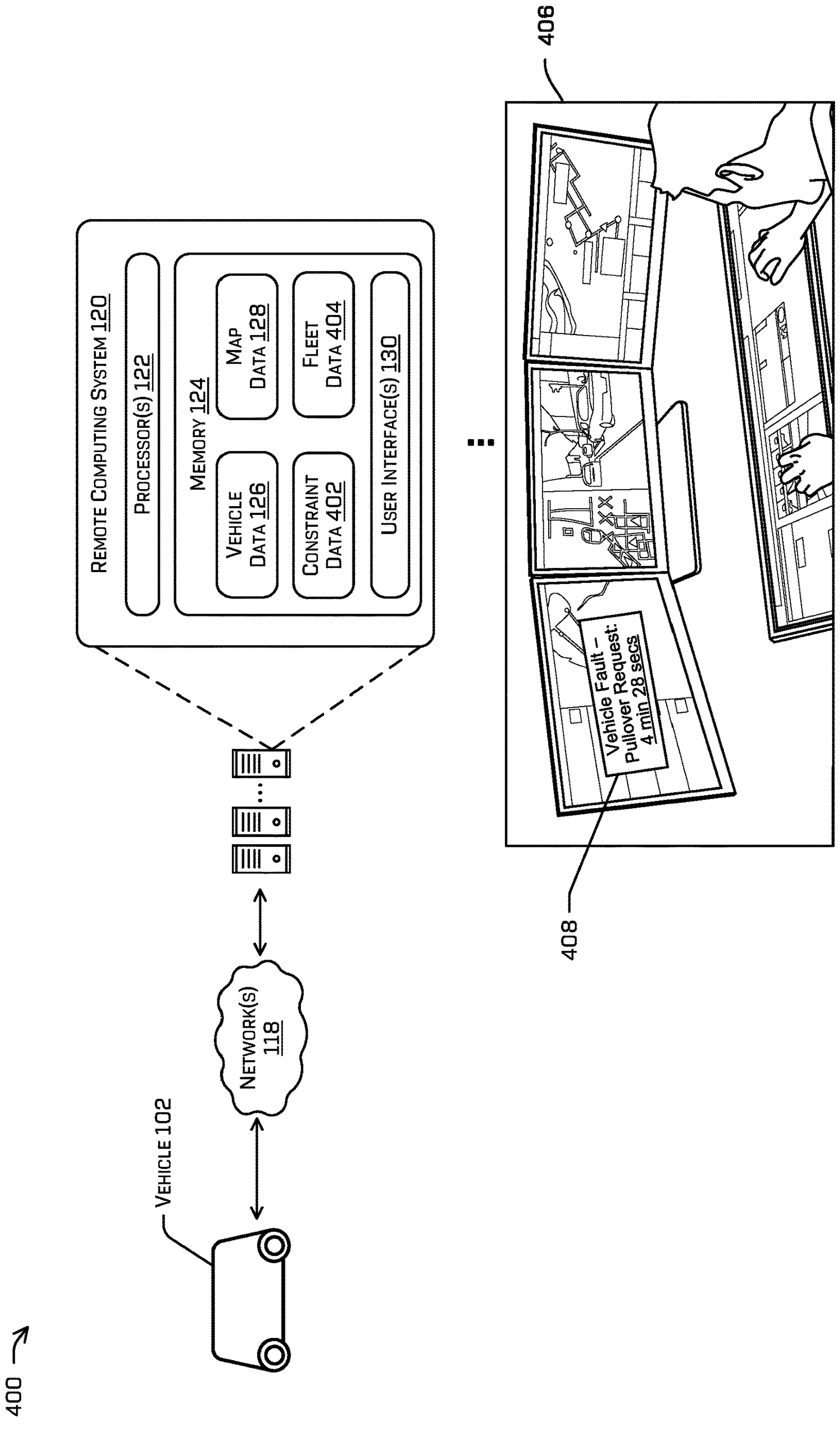
FIG. 4 is a block diagram illustrating components of an example system configured to determine a pullover location for a vehicle using a remote computing system, in accordance with one or more examples of the disclosure.
Figure 5:
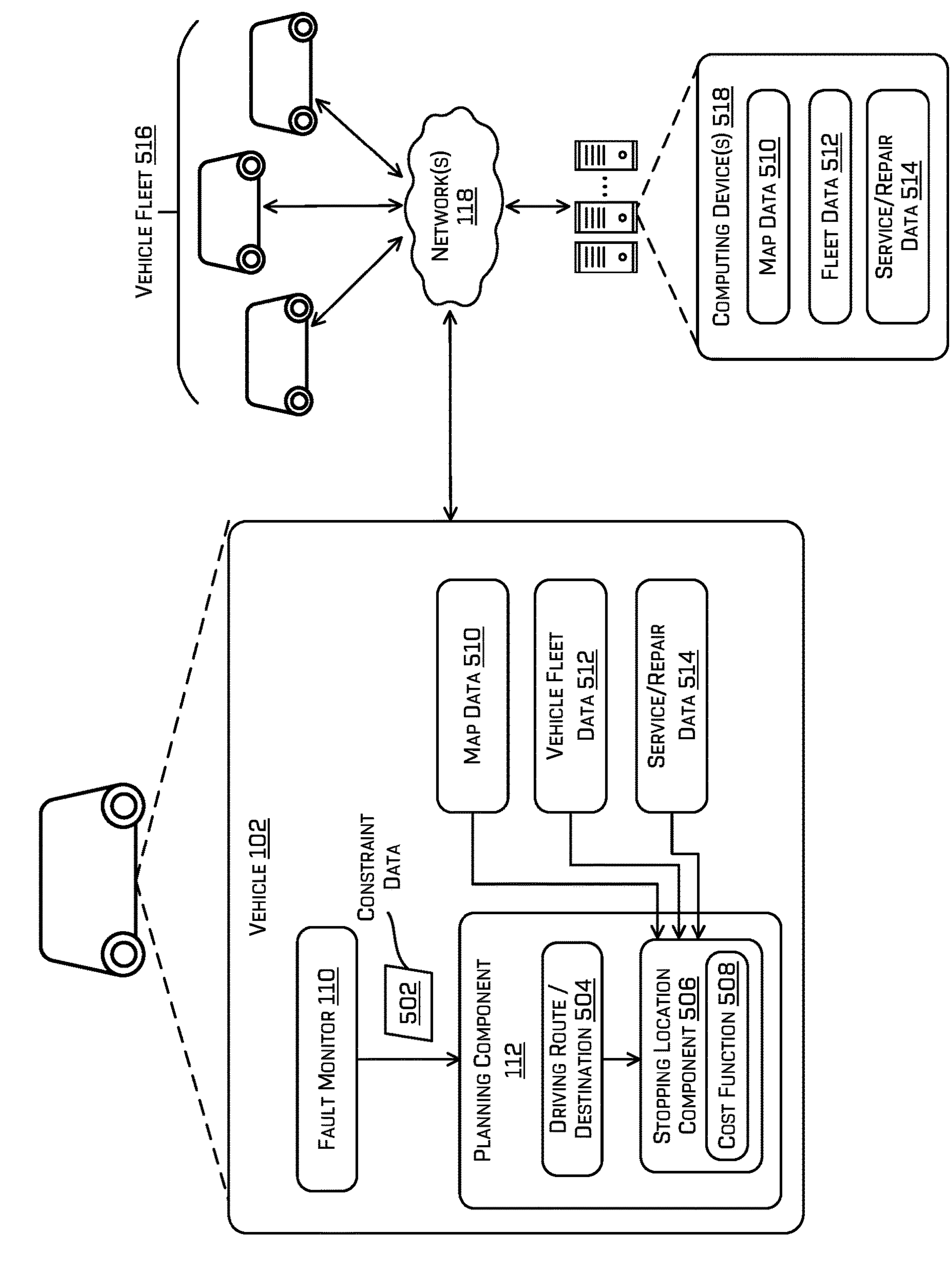
FIG. 5 is a block diagram illustrating components of an example system configured to determine a pullover location for a vehicle using an on-vehicle planning component, in accordance with one or more examples of the disclosure.
Figure 6:
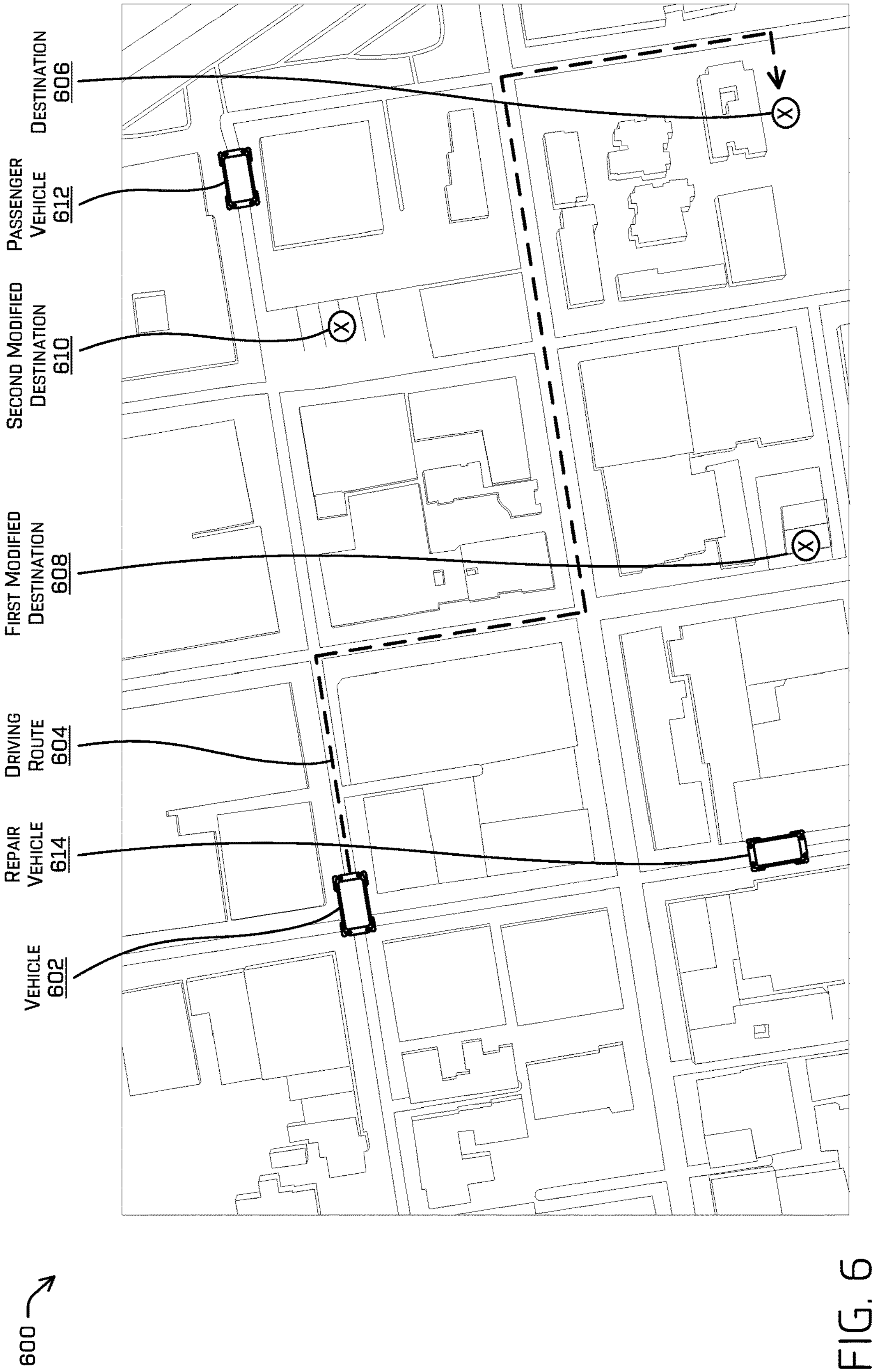
FIG. 6 illustrates an example map of a driving environment including a driving destination and modified destinations determined, using various techniques described herein.

FIGS. 4-6 depict various techniques for determining a modified destination for a vehicle 102, based on a time-dependent constraint generated by a fault monitor 110 of the vehicle 102. As described above, after determining a time-dependent constraint, the fault monitor 110 may transmit an indication of the constraint to a planning component 112 and/or a remote computing system 120 used by a teleoperator to control the vehicle 102. The constraint indication provided by the fault monitor 110 may take the form of a stopping request, and may include a duration of time and/or driving distance range by which the vehicle 102 may be required to stop. As described above, in some examples, a constraint indication also may include additional or alternative limitations on the operation of the vehicle, such as a maximum speed limit, acceleration and/or braking limitations, steering limitations, driving mode limitations (e.g., a unidirectional or bidirectional requirement), and/or driving condition limitations (e.g., road type requirements, weather requirements, visibility requirements, etc.).

FIG. 4 depicts an example system 400 in which a remote computing system 120 may be used to determine a stopping location for a vehicle 102, based on a time-dependent constraint indication (e.g., stopping request) received from the vehicle 102. As shown in this example, the remote computing system 120 (e.g., teleoperations device) may be communicatively coupled to the vehicle 102 via one or more networks 118. In some examples, the remote computing system 120 may be able to access various data relating to the vehicle 102, the driving environment, and/or a fleet of additional vehicles, and may present various views displaying vehicle-related data to a teleoperator via the user interface(s) 130. For instance, the remote computing system 120 may receive vehicle data 126 from the vehicle 102, including vehicle sensor data and/or vehicle state data, such as the current location, destination, driving route, trajectory, and/or the static or dynamic objects perceived by the vehicle 102. The remote computing system 120 also may receive map data from vehicle 102 and/or from one or more map servers, including map data for the regions proximate to the current location, intended destination, and planned driving route of the vehicle 102. As noted above, in some cases the map data 128 may include labeled or encoded locations identifying potential stopping locations for the vehicle 102 (e.g., parking spaces, parking lots, maintenance/repair locations, or road segments with sufficiently wide shoulders or emergency stopping lanes, etc.

Additionally, in this example, the remote computing system 120 may receive constraint data 402 from a fault monitor 110 of the vehicle 102. The constraint data 402 may include a time-dependent stopping request including an amount of time and/or distance by which the vehicle 102 may be required to stop, along with any other operating limitations of the vehicle 102 associated with the constraint. The remote computing system 120 in this example also may receive vehicle fleet data 404 from one or more additional vehicles and/or separate fleet management computing devices. The fleet data 404 may include the locations, capabilities, and/or current state data associated with one or more additional vehicles related to the vehicle 102. For instance, the fleet data 404 may include the relative locations of nearby alternative vehicles that may be capable of completing the mission instead of the vehicle 102, such as unoccupied passenger vehicles, available item delivery vehicles, etc. Additionally, the fleet data 404 may include the locations and capabilities of repair vehicles including tools and/or technicians that may be able to resolve the faults on the vehicle 102 that led to the time-dependent constraint.

Based on any combination of the data received by the remote computing system 120, it may generate and provide user interface(s) 130 including the capabilities to allow a teleoperator to monitor and control the vehicle 102. Examples of various systems and techniques for using teleoperators to control vehicles via remote computing devices can be found, for example, in U.S. Pat. No. 11,209,822, filed Jun. 28, 2019, and entitled "Techniques for Contacting a Teleoperator," and in U.S. patent application Ser. No. 18/076,300, filed Dec. 6, 2022, and entitled "Systems and Methods for Disengaging or Engaging Autonomy Remotely," the contents of both of which are incorporated herein by reference in their entirety and for all purposes.

Box 406 depicts example screens of a user interface 130 that may be provided to allow a teleoperator to monitor and control the vehicle 102. For example, via the user interface 130, the teleoperator may be able to view vehicle state data, sensor data, and a map of the driving environment based on road network data. Such maps may include a graphical representation of the current location of the vehicle and/or route the vehicle is currently traversing within the environment. In various examples, the displays of the user interface 130 may display digital representations, simplistic pictorial representations, animations, bounding boxes, arrows indicating a bearing and/or velocity of objects, icons representing objects, colorization of the sensor data, and/or other representations of the data, which may simplify the interpretation by the teleoperator. In some examples, the user interface 130 may additionally or alternatively display raw sensor data (e.g., camera images, lidar point clouds, etc.).

In some examples, the remote computing system 120 may access a teleoperations network that is configured to provide communication between two or more of the user interfaces 130 and their respective teleoperators. For instance, the user interface 130 of the remote computing system 120 may include communication components to allow the teleoperator to communicate with other teleoperators to facilitate and/or coordinate the guidance provided to the vehicles 102 of the fleet. The user interface 130 also may provide capabilities to the teleoperator to communicate with the occupants of the vehicle 102, pedestrians proximate the vehicle 102 and/or other vehicles of the vehicle fleet, etc. In some examples, there may be a remote computing system 120 and a teleoperator assigned to each vehicle in a fleet, and in some examples, a teleoperator may be assigned to monitor and control more than one vehicle of the fleet. In some examples, the remote computing system 120 and teleoperator might not be assigned to a specific vehicle 102, but may be configured to receive requests and provide guidance to any number of vehicles in the fleet that have received time-dependent constraints and/or encountered particular types of events or conditions.

As shown in this example, the user interface 130 provided to the teleoperator may include a component 408 indicating that the vehicle is subject to a time-dependent constraint. The component 408 may identify the remaining amount of time and/or distance that the vehicle may operate before being required to stop, along with any other conditions or limitations associated with the constraint. Based on the constraint indication/stopping request, the teleoperator may issue control commands to vehicle 102 remote to assure that the vehicle 102 safely stops before the constraint time and/or distance has been reached. In some cases, the user interface 130 may display data comparing the remaining time/distance of the vehicle's current mission (e.g., an estimated time and distance to reach the intended destination) and the time/distance requirements of the constraint. Based on the comparison data, the teleoperator may initially determine whether or not the vehicle 102 can complete its mission first, before stopping in compliance with the constraint. The user interface 130 also may provide a map displaying road network data, the current location of the vehicle 102, the intended destination of the vehicle, and one or more potential stopping locations for the vehicle 102. In various examples, a map and/or other components within the user interface 130 also may display events associated with the road network (e.g., weather or travel conditions along the intended driving route of the vehicle 102), construction zones, school zones, accidents, and/or special events. The user interface 130 also may display historical data related to the vehicle 102, such as the maintenance and service history, operational history, event history, path histories, occupancy histories, and other types of data associated with the vehicle 102. Further, as described below, the user interface 130 also may display data indicating the locations, states, and capabilities of additional vehicles within the vehicle fleet, such as the locations and current occupational status of other passenger or item delivery vehicles, the locations and capabilities of nearby maintenance and service vehicles, etc.

Based on any combination of the vehicle-related data provided by user interface 130, the teleoperator may determine a stopping location or other modified destination for the vehicle 102, based on the time-dependent constraint. After selecting a stopping location for the vehicle 102 that is compliant with the constraint, the teleoperator may use the user interface 130 to issue control commands to direct the vehicle 102 to the stopping location, using a route that can be automatically determined by the planning component 112 or manually selected by the teleoperator.

FIG. 5 depicts another example system 500 in which a planning component 112 may be used to determine a stopping location for a vehicle 102, based on a time-dependent constraint indication (e.g., stopping request) received from the fault monitor 110 of the vehicle 102. As described above, the planning component 112 may be used instead of, or in addition to, a teleoperator device (e.g., the remote computing system 120) to determine a modified destination to stop the vehicle 102 based on receiving a time-dependent constraint. Examples of various systems and techniques for using planning components and/or teleoperator devices to pullover vehicles can be found, for example, in U.S. patent application Ser. No. 17/958,146, filed Sep. 20, 2022, and entitled "Intelligent Vehicle Pull Over," the contents which are incorporated herein by reference in their entirety and for all purposes.

As shown in this example, the planning component 112 may receive and use any of the vehicle-related data described herein to determine an optimal (e.g., lowest-cost) modified destination for the vehicle 102, based on the time-dependent constraint. In some cases, the data received and/or the analyses performed by the planning component 112 may be similar or identical to the data received and/or the analyses performed by a teleoperator via the remote computing system 120, as described above in FIG. 4. For instance, the planning component 112 may receive constraint data 502 (e.g., a constraint indication and/or stopping request) from the fault monitor 110. The constraint data 502 may include the amount of time and/or distance by which the vehicle 102 may be required to stop, along with any other operating limitations of the vehicle 102 associated with the constraint. After receiving the constraint data 502, the planning component 112 may compare the constraint requirements to the current mission of the vehicle (e.g., driving route and destination 504), to determine whether or not the current mission can be completed before stopping the vehicle 102 in compliance with the constraint.

To determine and evaluate potential stopping locations, the planning component 112 may include a stopping location component 506, including one or more cost functions 508. The cost functions 508 may be used to evaluate any number of possible stopping locations, and to select an optimal (e.g., lowest cost) location for stopping the vehicle 102 that complies with the constraint time and/or distance. In some examples, the stopping location component may receive map data 510, vehicle fleet data 512, and/or service/repair data 514, which can be used in conjunction with current vehicle state and location data, driving route and destination 504, and constraint data 502, to determine potential stopping locations. For instance, as noted above, the map data 510 may include labeled or encoded locations identifying potential stopping locations for the vehicle 102. The vehicle fleet data 512 may include the locations, capabilities, and/or current state data associated with one or more additional vehicles related to the vehicle 102, such as the relative locations of nearby alternative vehicles that may be capable of completing the mission instead of the vehicle 102 (e.g., unoccupied passenger vehicles, available item delivery vehicles, etc.). The service/repair data 514 may include fixed locations of storage and/or vehicle repair locations, and/or locations and capabilities of mobile repair/technician vehicles, that may be capable of remedying the vehicle fault(s) that caused the fault monitor to generate the constraint. As shown in this example, the vehicle 102 may receive the map data, vehicle fleet data 512, and/or service/repair data 514 via one or more network(s) 118, from other vehicles in the fleet and/or from computing device(s) 518 (e.g., teleoperations devices, map servers, fleet management servers, etc.).

The stopping location component 506 may use various techniques to identify and evaluate potential stopping locations, and to select an optimal stopping location for the vehicle 102 based on the constraint data 502 received from the fault monitor 110. In some examples, the stopping location component 506 may use the map data 510 to identify a number of potential stopping locations for the vehicle 102, such as a number (N) of the closest stopping locations to the current location of the vehicle 102, or all of the possible stopping locations that the vehicle 102 can drive to before reaching the constraint time and/or distance. The various potential stopping locations may be compared, for example, using any number of heuristic-based and/or machine-learning based techniques for selecting an optimal stopping location for the vehicle. In some examples, the stopping location component 506 may use cost functions 508, based on various costs (or scores) that are assigned to are determined for the various potential stopping locations. For instance, for each potential stopping location, the stopping location component 506 may determine a number of safety costs (e.g., safety costs associated with driving to the location, parking at the location for a period of time, passengers exiting and/or waiting at the location for an alternative vehicle, etc.), route progress or efficiency costs (e.g., costs indicating how close the location is to the intended destination/mission endpoint of the vehicle 102), feasibility costs (e.g., costs based on the likelihood that the stopping location will be occupied and unavailable, costs based on the presences of nearby alternative stopping locations, costs based on the likelihood the vehicle will not reach the stopping location before violating the constraint), etc. Additionally or alternatively, the stopping location component 506 may compute costs for potential stopping locations based on the proximity of locations to the current and/or estimated positions of other vehicles in the fleet, including alternative passenger and/or delivery vehicles capable of completing the mission instead of the vehicle 102, and/or repair vehicles (e.g., technician vehicles, towing vehicles, etc.) capable of responding to and/or repairing the fault(s) on the vehicle 102 that caused the constraint. Based on the cost functions 508 and/or various other techniques for comparing potential stopping locations, the stopping location component 506 may use heuristics and/or machine-learning techniques to determine an optimal stopping location that will allow the vehicle to safely stop before reaching the duration of time and/or distance range defined by the constraint.

FIG. 6 depicts an example map 600 based on map data that may be used by the planning component 112 and/or a remote computing system 120 to determine a stopping location for a vehicle 602 based on a time-dependent constraint. In this example, the map 600 is shown in a graphical view, such as may be provided to a teleoperator via a user interface 130. In other examples, some or all of the same underlying data used to generate the map 600 (e.g., road network data, vehicle location and state data, vehicle destination and route data, potential stopping location data, vehicle fleet data, etc.) may be used by the planning component 112, as described above. In this example, the map 600 depicts a road network of the current driving environment of a vehicle 602, including a graphical depiction representing the vehicle, the current driving route 604 of the vehicle, and the planned destination 606 of the vehicle. Additionally, the map 600 in this example depicts graphical icons representing a number of potential stopping locations (e.g., the first modified destination 608 and second modified destination 610), as well as a number of other vehicles within the vehicle fleet that are nearby the vehicle 602 and/or nearby to one of the potential stopping locations identified for the vehicle 602. As described above in more detail, a teleoperator may use the map 600 (and/or a planning component 112 may use the underlying map data) to evaluate potential stopping locations and select a preferred (e.g., optimal or lowest cost) stopping location as the modified destination for the vehicle 602. Additionally, a teleoperator and/or planning component 112 may use the map 600 and associated data to determine a driving route from the current location of the vehicle 602 to the stopping location selected for the vehicle.

FIG. 7 illustrates a table 700 including an example set of time-dependent constraints, including examples of vehicle component faults and/or conditions associated with the constraints, and examples of the corresponding time and/or distance constraints. In some cases, the set of example constraints in table 700 may correspond to a set of constraints and conditions determined by a fault monitor 110, using the various techniques described herein, and the corresponding stopping requirements provided by the fault monitor 110 to the planning component 112 and/or remote control component 114. The data defining the time-dependent constraints, including the constraint criteria and the corresponding stopping requirements of the constraint, may be determined on the vehicle 102, and/or may be determined by a remote computing device (e.g., a server associated with a vehicle fleet) and transmitted to the vehicle 102 for use by the fault monitor 110.

Constraint 702 represents a first example time-dependent constraint that may be applied by a vehicle 102 in response to a vehicle component fault. In this example, the constraint 702 is associated with a low pressure reading of a tire pressure sensor on the front-right tire of the vehicle 102. When the low-pressure reading is detected by the fault monitor 110, the fault monitor 110 may apply constraint 702, which may include transmitting a stopping requirement of 10 minutes (e.g., a maximum operating time) and a stopping distance of 5 miles (e.g., a maximum driving distance) to the planning component 112 and/or remote control component 114.

Constraint 704 represents a second example time-dependent constraint that may be determined and applied by a fault monitor 110 of a vehicle 102. In this example, the constraint 704 is associated with a monitoring system error of the vehicle 102. When the monitoring system error is detected by the fault monitor 110, the fault monitor 110 may apply constraint 704, which may include transmitting a stopping requirement of 30 seconds (e.g., a maximum operating time) to the planning component 112 and/or remote control component 114. In various examples, such constraints may prioritize stopping (e.g., either the temporal or spatial constraint may be prioritized based at least in part on which brings the vehicle to a stop first). Though depicted as associated with both a time and distance constraint for illustrative purposes, the disclosure is not meant to be so limiting. In various examples, a component may be associated with one or more of a time or distance constraint. In any example, the distance and/or time may be determined based at least in part on the current state of the vehicle and the constraint listed.

In some cases, when the fault monitor 110 determines multiple time-dependent constraints during an overlapping driving time/distance while the vehicle 102 is operating, it may select the most conservative (e.g., most restrictive) constraint (or combination of constraints) to apply. Of course, other combinations of such constraints may be determined and/or mapped. In this example, if the fault monitor 110 detects a low tire pressure fault triggering constraint 702 and detects the monitoring system error triggering constraint 704 at approximately the same time, regardless of which fault is detected first, the fault monitor 110 may determine that the shorter time constraint of constraint 704 (e.g., 30 secs) may supersede the longer time constraint of constraint 702, so that the vehicle may be stopped in time to comply with both constraints.

Constraint 706 represents a third example time-dependent constraint that may be determined and applied by a fault monitor 110 of a vehicle 102. In this example, the constraint 706 may be triggered when the fault monitor 110 detects a combination of multiple faults concurrently on the vehicle 102. For example, when the fault monitor 110 detects an outage of the stability control system of the vehicle 102 at a same time (e.g., concurrently or within a time threshold) when an error is detected in the rear braking system, then the fault monitor 110 may apply constraint 706 by transmitting a stopping requirement of 2.5 minutes and a maximum driving distance of 1 mile to the planning component 112 and/or remote control component 114.

Constraint 708 represents a fourth example time-dependent constraint that may be determined and applied by a fault monitor 110 of a vehicle 102. In this example, the constraint 708 may be triggered when the fault monitor 110 detects a combination of a particular fault on the vehicle 102 (e.g., an outage of a long-range lidar sensor) with a particular driving condition (e.g., fog or rainy driving conditions). When this combination of vehicle fault and driving condition is detected, the fault monitor 110 may apply constraint 708 by transmitting a stopping requirement of 1 minutes and a maximum driving distance of 0.5 miles to the planning component 112 and/or remote control component 114.

Constraint 710 represents a fifth example time-dependent constraint that may be determined and applied by a fault monitor 110 of a vehicle 102. In this example, the constraint 710 may be triggered when the fault monitor 110 detects a combination of a particular fault (e.g., an occlusion of a front-left camera on the vehicle 102) with a particular driving condition (e.g., night driving conditions). When this combination of vehicle fault and driving condition is detected, the fault monitor 110 may apply constraint 710 by transmitting a stopping requirement of 10 minutes and a maximum driving distance of 2 miles to the planning component 112 and/or remote control component 114.

Figure 8:
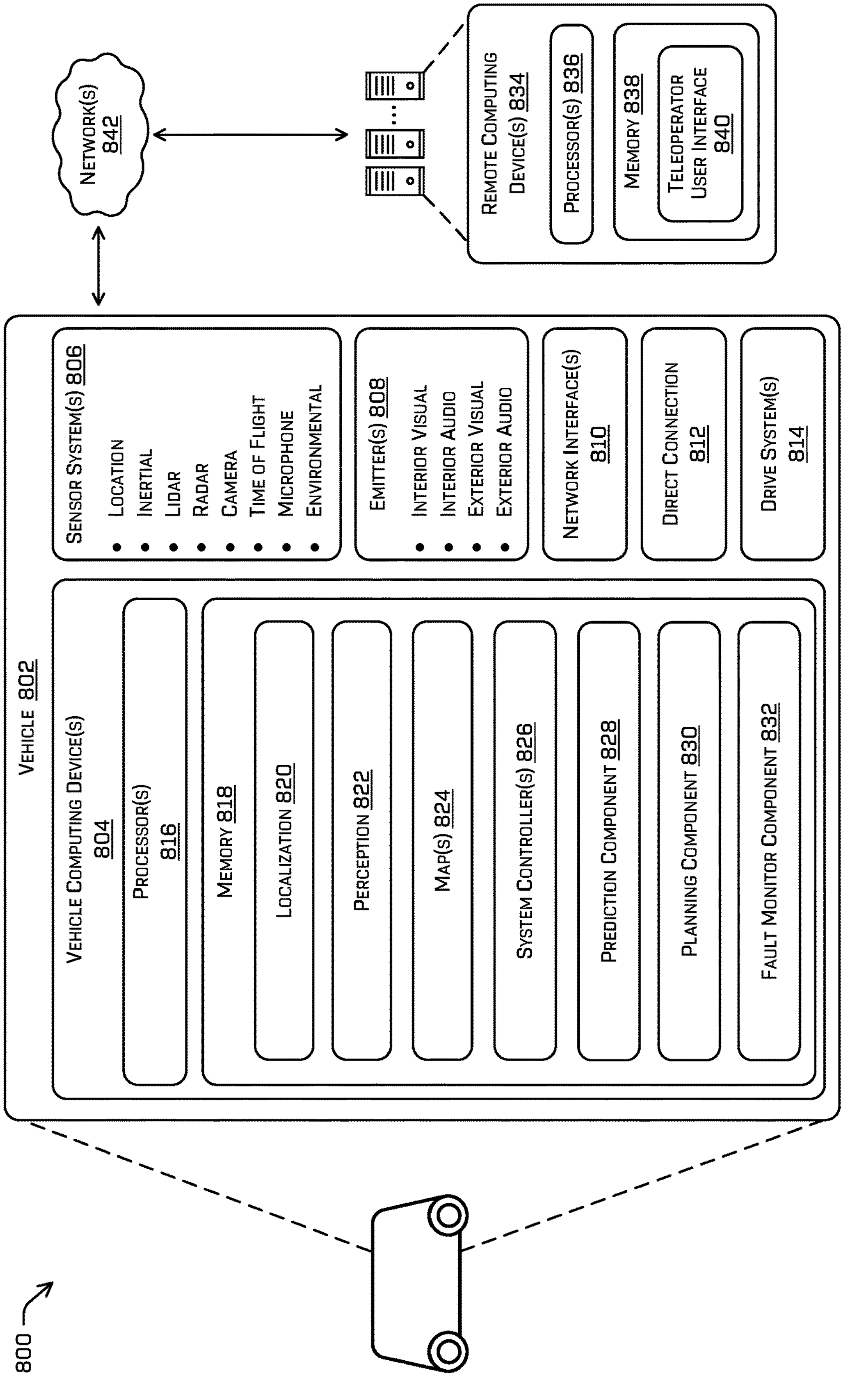
FIG. 8 is a block diagram illustrating an example system, including an autonomous vehicle and a separate computing device, for implementing various techniques described herein.

FIG. 8 is a block diagram of an example system 800 for implementing the techniques described herein. In at least one example, the system 800 may include a vehicle, such as vehicle 802. The vehicle 802 may include one or more vehicle computing devices 804, one or more sensor systems 806, one or more emitters 808, one or more network interfaces 810, at least one direct connection 812, and one or more drive systems 814.

The vehicle computing device 804 may include one or more processors 816 and memory 818 communicatively coupled with the processor(s) 816. In the illustrated example, the vehicle 802 is an autonomous vehicle; however, the vehicle 802 could be any other type of vehicle, such as a semi-autonomous vehicle, or any other system having driving trajectory planning/navigation functionality. For example, the vehicle 802 may be similar or identical to the vehicle 102 described above. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification.

In the illustrated example, the memory 818 of the vehicle computing device 804 stores a localization component 820, a perception component 822, one or more maps 824 (or map data), one or more system controllers 826, a prediction component 828, a planning component 830, and a fault monitor component 832. Though depicted in FIG. 8 as residing in the memory 818 for illustrative purposes, it is contemplated that the localization component 820, the perception component 822, the maps 824, the system controllers 826, the prediction component 828, the planning component 830, and the fault monitor component 832 may additionally, or alternatively, be accessible to the vehicle 802 (e.g., stored on, or otherwise accessible by, memory remote from the vehicle 802, such as, for example, memory 838 of one or more remote computing device(s) 834). In some examples, the remote computing device(s) 834 may include teleoperator devices, and the memory 838 may include one or more teleoperator user interfaces 840.

In at least one example, the localization component 820 may include functionality to receive sensor data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment, such as from map(s) 824, and may continuously determine a location and/or orientation of the vehicle 802 within the environment. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 802. In some instances, the localization component 820 may provide data to various components of the vehicle 802 to determine an initial position of the vehicle 802 for determining the relevance of an object to the vehicle 802, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or a classification of the object as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 818 may further include one or more maps 824 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 802 may be controlled based at least in part on the map(s) 824. That is, the map(s) 824 may be used in connection with the localization component 820, the perception component 822, the prediction component 828, and/or the planning component 830 to determine a location of the vehicle 802, detect objects in an environment, generate routes, determine actions and/or trajectories to navigate within an environment.

In some examples, the one or more maps 824 may be stored on a remote computing device(s) (such as the remote computing device(s) 834) accessible via network(s) 842. In some examples, multiple maps 824 may be stored based on, for example, a characteristic (e.g., type of entity, time of day, day of week, season of the year, etc.). Storing multiple maps 824 may have similar memory requirements, but increase the speed at which data in a map may be accessed.

In at least one example, the vehicle computing device 804 may include one or more system controllers 826, which may be configured to control steering, propulsion, braking, safety, emitters, communication, and other systems of the vehicle 802. The system controller(s) 826 may communicate with and/or control corresponding systems of the drive system(s) 814 and/or other components of the vehicle 802.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some instances, the prediction component 828 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 828 may generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior.

The planning component 830 may include various components configured to determine a trajectory for the vehicle 802 to follow to traverse through an environment. In various examples, the planning component 830 may determine various routes and trajectories and various levels of detail. For example, the planning component 830 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 830 may generate an instruction for guiding the vehicle 802 along at least a portion of the route from the first location to the second location. In at least one example, the planning component 830 may determine how to guide the vehicle 802 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single trajectory of the multiple trajectories in a receding data horizon having the highest confidence level may be selected to operate the vehicle. In various examples, the planning component 830 may select a trajectory for the vehicle 802.

In other examples, the planning component 830 may alternatively, or additionally, use data from the localization component 820, the perception component 822, map(s) 824, and/or the prediction component 828 to determine a trajectory for the vehicle 802 to follow to traverse through an environment. For example, the planning component 830 may receive data (e.g., object data) from the localization component 820, the perception component 822, and/or the prediction component 828 regarding objects associated with an environment. In some examples, the planning component 830 receives data for relevant objects within the environment. Using this data, the planning component 830 may determine a route to travel from a first location (e.g., a current location) to a second location (e.g., a target location) to avoid objects in an environment. In at least some examples, such a planning component 830 may determine there is no such collision-free trajectory and, in turn, provide a trajectory that brings vehicle 802 to a safe stop avoiding all collisions and/or otherwise mitigating damage.

In some instances, aspects of some or all of the components discussed herein may include any models, techniques, and/or machine learned techniques. For example, in some instances, the components in the memory 818 (and the memory 838, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device 804. Additionally, or in the alternative, the sensor system(s) 806 may send sensor data, via the one or more networks 842, to the one or more computing device(s) 834 at a particular frequency, after a lapse of a predetermined period of time, in near real-time, etc.

The vehicle 802 may also include one or more emitters 808 for emitting light and/or sound. The emitter(s) 808 may include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 may also include one or more network interfaces 810 (or communication connections) that enable communication between the vehicle 802 and one or more other local or remote computing device(s). For instance, the network interfaces 810 may facilitate communication with other local computing device(s) on the vehicle 802 and/or the drive system(s) 814. Also, the network interface(s) 810 may allow the vehicle to communicate with other nearby computing device(s) (e.g., computing device(s) 834, other nearby vehicles, etc.) and/or one or more remote sensor system(s) for receiving sensor data. The network interface(s) 810 also may enable the vehicle 802 to communicate with a remote teleoperations computing device or other remote services.

The network interface(s) 810 may include physical and/or logical interfaces for connecting the vehicle computing device 804 to another computing device or a network, such as network(s) 842. For example, the network interface(s) 810 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 may include one or more drive systems 814. In some examples, the vehicle 802 may have a single drive system 814. In at least one example, if the vehicle 802 has multiple drive systems 814, individual drive systems 814 may be positioned on opposite ends of the vehicle 802 (e.g., the front and the rear, etc.). In at least one example, the drive system(s) 814 may include one or more sensor systems to detect conditions of the drive system(s) 814 and/or the surroundings of the vehicle 802. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 814. In some cases, the sensor system(s) on the drive system(s) 814 may overlap or supplement corresponding systems of the vehicle 802 (e.g., sensor system(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 814. Furthermore, the drive system(s) 814 may also include one or more communication connection(s) that enable communication by the respective drive module with one or more other local or remote computing device(s).

In at least one example, the direct connection 812 may provide a physical interface to couple the one or more drive system(s) 814 with the body of the vehicle 802. For example, the direct connection 812 may allow the transfer of energy, fluids, air, data, etc. between the drive system(s) 814 and the vehicle. In some instances, the direct connection 812 may further releasably secure the drive system(s) 814 to the body of the vehicle 802.

In at least one example, the localization component 820, the perception component 822, the maps 824, the system controllers 826, the prediction component 828, the planning component 830, and the fault monitor component 832 may process sensor data, as described above, and may send their respective outputs, over the one or more network(s) 842, to the computing device(s) 834. In at least one example, the localization component 820, the perception component 822, the maps 824, the system controllers 826, the prediction component 828, the planning component 830, and/or the fault monitor component 832 may send their respective outputs to the computing device(s) 834 at a particular frequency, after a lapse of a predetermined period of time, in near real-time, etc.

In some examples, the vehicle 802 may send sensor data to the computing device(s) 834 via the network(s) 842. In some examples, the vehicle 802 may receive sensor data from the computing device(s) 834 and/or remote sensor system(s) via the network(s) 842. The sensor data may include raw sensor data and/or processed sensor data and/or representations of sensor data. In some examples, the sensor data (raw or processed) may be sent and/or received as one or more log files.

The remote computing device(s) 834 may include processor(s) 836 and a memory 838, and may be similar or identical to the remote computing systems(s) 120 (and/or computer device(s) 520) discussed above in reference to FIGS. 1-7. For instance, the memory 838 may include one or more teleoperator user interfaces 840 configured to allow teleoperators to review constraint indications and/or stopping requested received from the vehicle 802, and determine modified destinations and/or driving routes for the vehicle 802, for any number of vehicles in a vehicle fleet. Additionally, in some examples, the memory 838 may store one or more of components that are similar to the component(s) stored in the memory 818 of the vehicle 802. In such examples, the computing device(s) 834 may be configured to perform one or more of the processes described herein with respect to the vehicle 802.

The processor(s) 816 of the vehicle 802 and the processor(s) 836 of the computing device(s) 834 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and memory 838 are examples of non-transitory computer-readable media. The memory 818 and memory 838 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 8 is illustrated as a distributed system, in alternative examples, components of the vehicle 802 may be associated with the computing device(s) 834 and/or components of the computing device(s) 834 may be associated with the vehicle 802. That is, the vehicle 802 may perform one or more of the functions associated with the computing device(s) 834, and vice versa.

Figure 9:
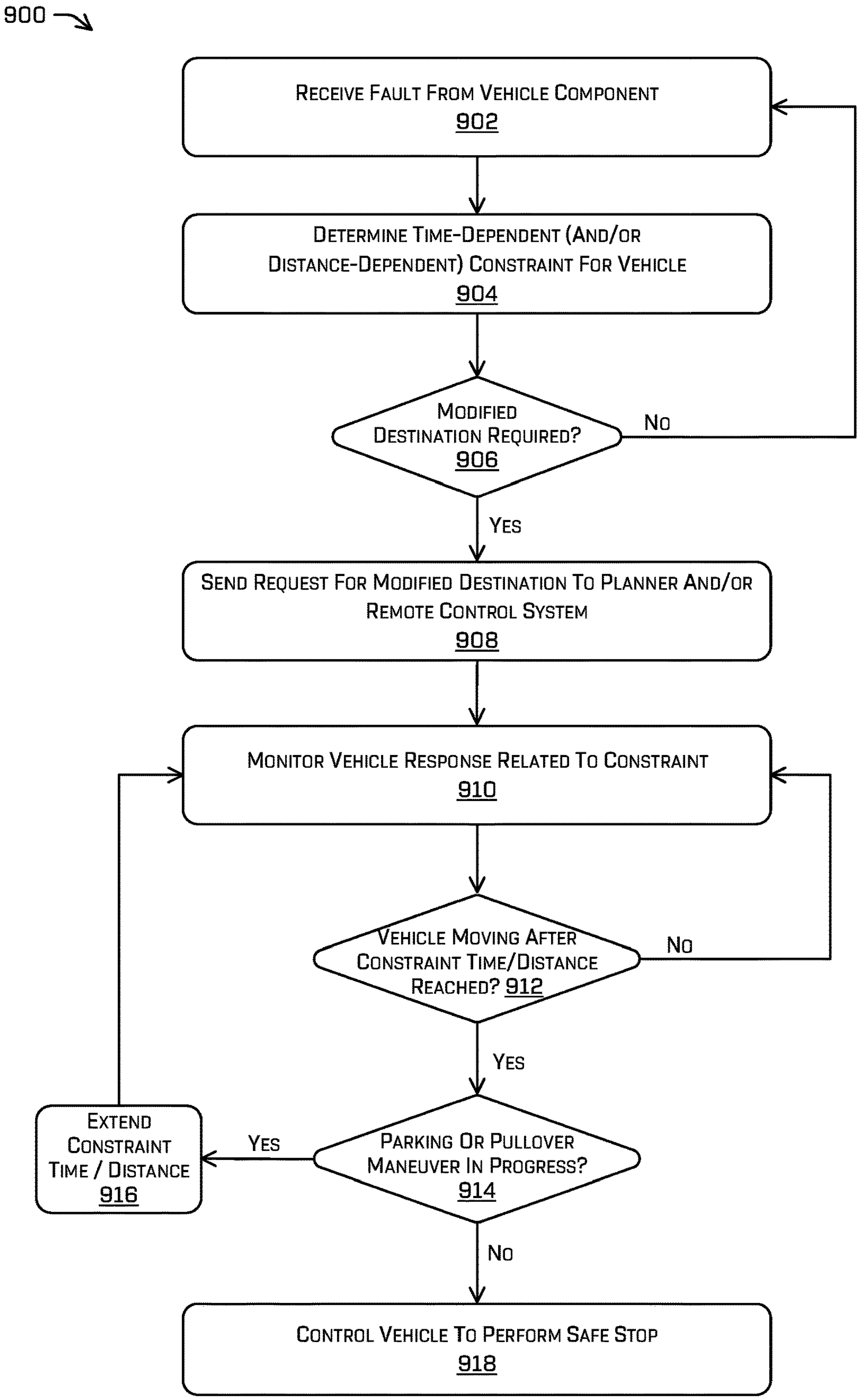
FIG. 9 is a flow diagram illustrating an example technique for determining and applying a time-dependent vehicle constraint based on a detected fault, in accordance with one or more examples of the disclosure.

FIG. 9 depicts an example process 900 of determining a time-dependent constraint based on the detection of one or more vehicle faults, and then using a planning component and/or remote control system to determine a stopping location for the vehicle to comply with the constraint. As described in this example, some or all of the operations in process 900 may be performed by a fault monitoring component (e.g., fault monitor 110) of a vehicle (e.g., vehicle 102) operating in a driving environment. In some examples, the vehicle described in process 900 also may include a planning component 112 and/or remote control component 114 configured to determine an optimal stopping location for the vehicle 102 based on constraint indications and/or stopping requests received from the fault monitor 110.

At operation 902, the fault monitor 110 may receive fault indications from one or more vehicle components. As described above, the fault monitor 110 may receive faults (e.g., errors, failures, status data, output anomalies, etc.) from any number of vehicle components 202. Fault data received in operation 902 may include faults associated with vehicles sensors of the vehicle, a perception system, a prediction system, a planning component, various other components of the vehicle (e.g., wheels, tires, lights, electronics, doors, windows, etc.), a network error affecting communications between the vehicle a teleoperator device, or the like. Additionally or alternatively, the fault monitor 110 may receive data indicating particular conditions on the vehicle 102 and/or within the driving environment, such as health-related data associated with vehicle components and/or systems, environmental conditions, traffic-related conditions, occupant-related conditions, etc.

At operation 904, the fault monitor 110 may determine a time-dependent constraint for the vehicle 102, based on the detected faults and/or other conditions associated with the vehicle 102 and/or the driving environment. For example, based on the faults and/or conditions received in operation 902, the fault monitor 110 may determine that the vehicle 102 can continue operating for an additional period of time, and that an immediate stop is not required. The time-dependent constraint(s) determined by the fault monitor 110 in operation 904 may define durations of time (e.g., seconds, minutes, hours, days, etc.) and/or distances (e.g., meters, miles, etc.) the vehicle 102 can continue to operate, after which the vehicle 102 may be required to stop.

At operation 906, the fault monitor 110 may determine whether or not the vehicle 102 is able to complete its current mission to its intended destination, before complying with the constraint. As an example, if the vehicle 102 is currently transporting passengers or items to a destination that is approximately 20 minutes (or 20 miles) away, when a time-dependent constraint is received having a constraint time of 10 mins (or constraint distance of 10 miles), then the fault monitor 110 may that a modified destination may be required for stopping the vehicle before the intended destination can be reached (906: Yes). However, in a similar driving scenario, if the time-dependent constraint defines a constraint time of one hour, then the fault monitor 110 may determine that the vehicle 102 can complete its current mission before determining a stopping location to comply with the constraint (906: No). As another example, if a time-dependent constraint is received requiring the vehicle to stop within the next four hours, but the vehicle 102 is scheduled to return to a storage and maintenance facility in two hours, then the fault monitor 110 may ignore the time-dependent constraint and return to the storage and maintenance facility as scheduled (906: No). In some examples, operation 906 may be optional, and the fault monitor 110 may provide constraint indications and/or stopping requests to the planning component 112 and/or remote control component 114, allowing these components and systems to independently determine whether or not a modified destination is required for the vehicle 102.

When a modified destination for the vehicle 102 is required (or potentially required) based on the constraint (906: Yes), then at operation 908, the fault monitor 110 may send an indication of the constraint (e.g., a stopping request) to a planning component 112 of the vehicle 102 and/or a remote computing system 120 configured as a teleoperator device. The stopping request provided by the fault monitor 110 in operation 908 may include a duration of time and/or driving distance range associated with the constraint, after which the vehicle 102 may be required to stop. In some examples, a stopping request and/or constraint indication also may include additional or alternative limitations on the operation of the vehicle 102, such as a maximum speed limit, acceleration and/or braking limitations, steering limitations, driving mode limitations (e.g., a unidirectional or bidirectional requirement), and/or driving condition limitations (e.g., road type requirements, weather requirements, visibility requirements, etc.).

At operation 910, the fault monitor 110 may monitor the response of the vehicle 102, after providing the constraint indication and/or stopping request to the planning component 112 and/or remote control component 114. For example, the fault monitor 110 may receive an acknowledgment message from a teleoperator via a remote control system or the planning component 112, confirming that the stopping request has been received and/or that a modified stopping location has been determined for the vehicle 102.

At operation 912, the fault monitor 110 may evaluate compliance with the constraint, by determining whether the vehicle is still moving (or otherwise operating) when the time and/or distance requirements of the constraint have been reached. If the constraint time and/or distance have not yet been reached, and/or if the vehicle has been stopped (912: No), then process 900 may return to operation 910 for continued monitoring of the vehicle 102 by the fault monitor 110. However, if the constraint time and/or distance have been reached and the vehicle has not yet stopped at a stopping location (912: Yes), then process 900 may proceed to operation 914 to evaluate the current behavior of the vehicle.

At operation 914, the fault monitor 110 may determine whether the vehicle 102 is currently engaged in a stopping maneuver, such as in the process of pulling into a parking space, parking lot, or executing a pullover maneuver. If so (914: Yes), then at operation 916, the fault monitor 110 may determine a relatively small extension of the constraint time (e.g., 10 secs, 30 secs, etc.) and/or distance (e.g., 10 meters, 50 meters, etc.) so that the vehicle 102 can complete the current stopping maneuver. However, if the fault monitor 110 determines that is continuing along a normal driving route and not in the process of stopping when the constraint time and/or distance have been reached (914: No), then at operation 918 the fault monitor 110 may intervene by causing the vehicle 102 to initiate an immediate stopping maneuver. As noted above, stopping maneuvers initiated by the fault monitor 110 may include, for instance, immediate in-lane stops or immediate pullovers onto the right side or left side of the current road on which the vehicle is traveling. Because stops initiated by the fault monitor 110 may occur in non-optimal locations, the fault monitor 110 may initially provide stopping requests to the planning component 112 and/or remote control component 114, to determine safer and otherwise preferrable stopping locations while still complying with the time-dependent constraint.

Example Clauses

A. A vehicle comprising: one or more processors; and one or more non-transitory computer-readable media storing computer-executable instructions that, when executed, cause the one or more processors to perform operations comprising: controlling the vehicle to traverse a driving route to a destination in a driving environment; receiving, by a monitoring component, an indication of a fault output by a component of the vehicle, the fault impacting an ability of the vehicle to drive in the driving environment; determining, based at least in part on the fault, a non-zero duration of time for the vehicle to continue driving in the driving environment; determining, based at least in part on the duration of time, a modified destination for the vehicle; and controlling the vehicle to traverse a modified driving route to the modified destination.

B. The vehicle of paragraph A, wherein determining the modified destination for the vehicle comprises determining a location of a second vehicle, wherein the second vehicle includes at least one of: a passenger vehicle capable of transporting a passenger to the destination, or a technical assistance vehicle including service equipment capable of resolving the fault.

C. The vehicle of paragraph A, wherein determining the modified destination for the vehicle comprises: transmitting, to a remote operations computing device, the at least one of a duration of time or a distance range; and receiving the modified destination from the remote operations computing device.

D. The vehicle of paragraph A, wherein determining the duration of time comprises: determining a driving condition associated with the vehicle traversing the driving route; and determining the duration of time based at least in part on the driving condition.

E. The vehicle of paragraph A, the operations further comprising: determining, at a first time, that at least one of the duration of time or a distance range has been reached; determining, at the first time, that the vehicle is performing at least one of a parking maneuver or a pullover maneuver; and extending the at least one of the duration of time or the distance range based at least in part on determining that the vehicle is performing at least one of a parking maneuver or a pullover maneuver.

F. A method comprising: receiving, by a monitoring component of a vehicle, a fault output by a component of the vehicle while the vehicle is traversing a driving route to a destination; determining, based at least in part on the fault, a constraint associated with operating the vehicle, wherein the constraint includes at least one of a non-zero duration of time or a distance range; determining, based at least in part on the at least one of the duration of time or the distance range, a modified destination for the vehicle; and controlling the vehicle to traverse a modified driving route to the modified destination.

G. The method of paragraph F, wherein determining the modified destination for the vehicle comprises determining a location of a second vehicle, wherein the second vehicle includes at least one of: a passenger vehicle capable of transporting a passenger to the destination, or a technical assistance vehicle including service equipment capable of resolving the fault.

H. The method of paragraph F, wherein determining the modified destination for the vehicle comprises: determining the modified destination, by a planning component of the vehicle, based at least in part on: an estimated time for the vehicle to drive to the destination, the duration of time associated with the constraint, and map data associated with the driving route to the destination.

I. The method of paragraph F, wherein determining the modified destination for the vehicle comprises: transmitting, to a remote operations computing device, the at least one of the duration of time or the distance range; and receiving the modified destination from the remote operations computing device.

J. The method of paragraph F, further comprising: causing the vehicle to perform a stopping maneuver, prior to reaching the modified destination, based at least in part on determining that the at least one of the duration of time or the distance range associated with the constraint has been reached.

K. The method of paragraph F, wherein determining the constraint comprises: determining a driving condition associated with the vehicle traversing the driving route; and determining the at least one of the duration of time or the distance range, based at least in part on the driving condition.

L. The method of paragraph F, wherein determining the constraint comprises: receiving, by the monitoring component at a time associated with the fault, a second fault associated with a second component of the vehicle; and determining the constraint within a constraint store associated with the vehicle, wherein, in the constraint store, the constraint is associated with the fault of the component and the second fault of the second component.

M. The method of paragraph F, wherein determining the modified destination for the vehicle comprises: evaluating a cost function to determine a lowest-cost location to stop the vehicle, wherein the cost function is based at least in part on: a driving safety cost; a stopping location safety cost; and a route progress cost.

N. One or more non transitory computer readable media storing instructions executable by a processor, wherein the instructions, when executed, cause the processor to perform operations comprising: receiving, by a monitoring component of a vehicle, a fault output by a component of the vehicle, while the vehicle is traversing a driving route to a destination; determining, based at least in part on the fault, a constraint associated with operating the vehicle, wherein the constraint includes at least one of a duration of time or a distance range; determining, based at least in part on the at least one of the duration of time or the distance range, a modified destination for the vehicle; and controlling the vehicle to traverse a modified driving route to the modified destination.

O. The one or more non transitory computer readable media of paragraph N, wherein determining the modified destination for the vehicle comprises determining a location of a second vehicle, wherein the second vehicle includes at least one of: a passenger vehicle capable of transporting a passenger to the destination; or a technical assistance vehicle including service equipment capable of resolving the fault.

P. The one or more non transitory computer readable media of paragraph N, wherein determining the modified destination for the vehicle comprises: determining the modified destination, by a planning component of the vehicle, based at least in part on: an estimated time for the vehicle to drive to the destination, the duration of time associated with the constraint, and map data associated with the driving route to the destination.

Q. The one or more non transitory computer readable media of paragraph N, wherein determining the modified destination for the vehicle comprises: transmitting, to a remote operations computing device, the at least one of the duration of time or the distance range; and receiving the modified destination from the remote operations computing device.

R. The one or more non transitory computer readable media of paragraph N, the operations further comprising: causing the vehicle to perform a stopping maneuver, prior to reaching the modified destination, based at least in part on determining that the at least one of the duration of time or the distance range associated with the constraint has been reached.

S. The one or more non transitory computer readable media of paragraph N, wherein determining the constraint comprises: determining a driving condition associated with the vehicle traversing the driving route; and determining the at least one of the duration of time or the distance range, based at least in part on the driving condition.

T. The one or more non transitory computer readable media of paragraph N, wherein determining the constraint comprises: receiving, by the monitoring component at a time associated with the fault, a second fault associated with a second component of the vehicle; and determining the constraint within a constraint store associated with the vehicle, wherein, in the constraint store, the constraint is associated with the fault of the component and the second fault of the second component.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:

one or more processors; and one or more non-transitory computer-readable media storing computer-executable instructions that, when executed, cause the one or more processors to perform operations comprising:

controlling the vehicle to traverse a driving route to a destination in a driving environment;

receiving, by a monitoring component, an indication of a fault output by a component of the vehicle, the fault impacting an ability of the vehicle to drive in the driving environment;

determining, based at least in part on the fault and uncertainty data associated with the fault, a non-zero duration of time for the vehicle to continue driving in the driving environment;

determining, based at least in part on the fault and the duration of time, a likelihood of the vehicle arriving at the destination;

determining, based at least in part on the duration of time and the likelihood failing to meet or exceed a threshold likelihood, a modified destination for the vehicle; and controlling the vehicle to traverse a modified driving route to the modified destination.

2. The vehicle of claim 1, wherein determining the modified destination for the vehicle comprises determining a location of a second vehicle, wherein the second vehicle includes at least one of:

a passenger vehicle capable of transporting a passenger to the destination, or a technical assistance vehicle including service equipment capable of resolving the fault.

3. The vehicle of claim 1, wherein determining the modified destination for the vehicle comprises:

transmitting, to a remote operations computing device, the at least one of a duration of time or a distance range; and receiving the modified destination from the remote operations computing device.

4. The vehicle of claim 1, wherein determining the duration of time comprises:

determining a driving condition associated with the vehicle traversing the driving route; and determining the duration of time based at least in part on the driving condition.

5. The vehicle of claim 1, the operations further comprising:

determining, at a first time, that at least one of the duration of time or a distance range has been reached;

determining, at the first time, that the vehicle is performing at least one of a parking maneuver or a pullover maneuver; and extending the at least one of the duration of time or the distance range based at least in part on determining that the vehicle is performing at least one of a parking maneuver or a pullover maneuver.

6. The vehicle of claim 1, wherein the likelihood is associated with a confidence score, and wherein determining the modified destination is further based at least in part on the confidence score failing to meet or exceed a threshold confidence score.

7. The vehicle of claim 6, wherein the confidence score is based at least in part on at least one of a safety buffer time or a safety buffer distance associated with the fault.

8. A method comprising:

receiving, by a monitoring component of a vehicle, a fault output by a component of the vehicle while the vehicle is traversing a driving route to a destination;

determining, based at least in part on the fault, a constraint associated with operating the vehicle, wherein the constraint comprises a distance range;

determining an updated distance range based at least in part on applying a safety buffer to the distance range;

determining, based at least in part on the updated distance range, a likelihood of the vehicle arriving at the destination;

determining, based at least in part on the likelihood, a modified destination for the vehicle; and controlling the vehicle to traverse a modified driving route to the modified destination.

9. The method of claim 8, wherein determining the modified destination for the vehicle comprises determining a location of a second vehicle, wherein the second vehicle includes at least one of:

a passenger vehicle capable of transporting a passenger to the destination, or a technical assistance vehicle including service equipment capable of resolving the fault.

10. The method of claim 8, wherein determining the modified destination for the vehicle comprises:

determining the modified destination, by a planning component of the vehicle, based at least in part on:

an estimated time for the vehicle to drive to the destination, a duration of time associated with the constraint, and map data associated with the driving route to the destination.

11. The method of claim 8, wherein determining the modified destination for the vehicle comprises:

transmitting, to a remote operations computing device, at least one of a duration of time associated with the constraint or the updated distance range; and receiving the modified destination from the remote operations computing device.

12. The method of claim 8, further comprising:
determining a driving condition associated with the vehicle traversing the driving route; and
determining at least one of a duration of time or the distance range based at least in part on the driving condition.

13. The method of claim 8, wherein determining the constraint comprises:
receiving, by the monitoring component at a time associated with the fault, a second fault associated with a second component of the vehicle; and
determining the constraint within a constraint store associated with the vehicle, wherein, in the constraint store, the constraint is associated with the fault of the component and the second fault of the second component.

14. The method of claim 8, wherein determining the modified destination for the vehicle comprises:
evaluating a cost function to determine a lowest-cost location to stop the vehicle, wherein the cost function is based at least in part on:
a driving safety cost;
a stopping location safety cost; and
a route progress cost.

15. One or more non-transitory computer-readable media storing instructions executable by a processor, wherein the instructions, when executed, cause the processor to perform operations comprising:
receiving, by a monitoring component of a vehicle, a fault output by a component of the vehicle while the vehicle is traversing a driving route to a destination;
determining, based at least in part on the fault and uncertainty data associated with the fault, a constraint associated with operating the vehicle, wherein the constraint comprises a non-zero distance range;
determining, based at least in part on the non-zero distance range, a likelihood of the vehicle arriving at the destination;
determining, based at least in part on the likelihood, a modified destination for the vehicle; and
controlling the vehicle to traverse a modified driving route to the modified destination.

16. The one or more non-transitory computer-readable media of claim 15, wherein determining the modified destination for the vehicle comprises:
determining the modified destination, by a planning component of the vehicle, based at least in part on:
an estimated time for the vehicle to drive to the destination,
a duration of time associated with the constraint, and
map data associated with the driving route to the destination.

17. The one or more non-transitory computer-readable media of claim 15, wherein determining the modified destination for the vehicle comprises:
transmitting, to a remote operations computing device, at least one of a duration of time associated with the constraint or the non-zero distance range; and
receiving the modified destination from the remote operations computing device.

18. The one or more non-transitory computer-readable media of claim 15, the operations further comprising:
causing the vehicle to perform a stopping maneuver, prior to reaching the modified destination, based at least in part on determining that at least one of a duration of time or the non-zero distance range associated with the constraint has been reached.

19. The one or more non-transitory computer-readable media of claim 15, further comprising:
determining a driving condition associated with the vehicle traversing the driving route; and
determining at least one of a duration of time or the non-zero distance range based at least in part on the driving condition.

20. The one or more non-transitory computer-readable media of claim 15, wherein determining the constraint comprises:
receiving, by the monitoring component at a time associated with the fault, a second fault associated with a second component of the vehicle; and
determining the constraint within a constraint store associated with the vehicle, wherein, in the constraint store, the constraint is associated with the fault of the component and the second fault of the second component.

* * * * *